United States Patent
Li et al.

(10) Patent No.: US 11,799,697 B2
(45) Date of Patent: Oct. 24, 2023

(54) FAST EQUALIZATION METHOD, CHIP, AND COMMUNICATIONS SYSTEM

(71) Applicant: HUAWEI TECHNOLOGIES CO., LTD., Guangdong (CN)

(72) Inventors: Yongyao Li, Shenzhen (CN); Fei Luo, Chengdu (CN); Er Nie, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 17/959,490

(22) Filed: Oct. 4, 2022

(65) Prior Publication Data

US 2023/0094563 A1    Mar. 30, 2023

Related U.S. Application Data

(63) Continuation of application No. 17/100,033, filed on Nov. 20, 2020, now Pat. No. 11,496,340, which is a
(Continued)

(30) Foreign Application Priority Data

Jun. 19, 2018 (CN) .......................... 201810629423.8
Aug. 17, 2018 (CN) .......................... 201810942481.6

(51) Int. Cl.
*H04L 25/03* (2006.01)
*G06F 13/42* (2006.01)
*H04B 1/38* (2015.01)

(52) U.S. Cl.
CPC .... *H04L 25/03012* (2013.01); *G06F 13/4282* (2013.01); *H04B 1/38* (2013.01); *G06F 2213/0026* (2013.01)

(58) Field of Classification Search
CPC .......... H04L 25/03012; G06F 13/4282; G06F 2213/0026; G06F 13/385; G06F 13/1684;
(Continued)

(56) References Cited

U.S. PATENT DOCUMENTS

2004/0219909 A1* 11/2004 Kennedy ............... H04W 28/26
                                                        455/424
2007/0153737 A1*  7/2007 Singh .................... H04W 40/18
                                                        370/331
(Continued)

FOREIGN PATENT DOCUMENTS

CN    102662896 A     9/2012
CN    104050138 A     9/2014
(Continued)

OTHER PUBLICATIONS

Cache Coherent Interconnect for Accelerators, CCIX Version Master 6.1, May 10, 2018, total 352 pages.

*Primary Examiner* — Sam K Ahn
*Assistant Examiner* — Amneet Singh
(74) *Attorney, Agent, or Firm* — WOMBLE BOND DICKINSON (US) LLP

(57) ABSTRACT

A fast equalization method is provided, which includes: storing a receive parameter and a transmit parameter, of each of a primary chip and a secondary chip, that meet a link stability requirement and that are obtained when link equalization is previously performed; and when determining that link equalization needs to be performed, configuring, as first fast equalization timeout duration, a larger value in initial fast equalization timeout duration of the primary chip and initial fast equalization timeout duration of the secondary chip, and invoking the foregoing receive and transmit parameters, so that the primary chip and the secondary chip perform a current time of link equalization based on the first fast equalization timeout duration and the foregoing transmit and receive parameters.

20 Claims, 5 Drawing Sheets

Related U.S. Application Data continuation of application No. PCT/CN2019/081635, filed on Apr. 6, 2019.

(58) Field of Classification Search
CPC .............. G06F 13/4068; G06F 13/4221; G06F 2213/0024; H04B 1/38
See application file for complete search history.

(56) References Cited

U.S. PATENT DOCUMENTS

| | | |
|---|---|---|
| 2013/0051483 A1 | 2/2013 | Wyatt et al. |
| 2013/0054851 A1 | 2/2013 | Barbiero et al. |
| 2013/0067127 A1 | 3/2013 | Hopgood et al. |
| 2014/0006675 A1 | 1/2014 | Meir |
| 2014/0181339 A1 | 6/2014 | Hopgood et al. |
| 2014/0281067 A1 | 9/2014 | Das Sharma et al. |
| 2014/0313909 A1* | 10/2014 | Doherty ............... H04W 24/02 370/252 |
| 2019/0034376 A1 | 1/2019 | Das Sharma |

FOREIGN PATENT DOCUMENTS

| | | |
|---|---|---|
| CN | 107636620 A | 1/2018 |
| CN | 104050136 B | 3/2018 |
| CN | 109376103 A | 2/2019 |

\* cited by examiner

US 11,799,697 B2

FAST EQUALIZATION METHOD, CHIP, AND COMMUNICATIONS SYSTEM

CROSS-REFERENCE TO RELATED APPLICATIONS

This application is a continuation of U.S. patent application Ser. No. 17/100,033, filed on Nov. 20, 2020, which is a continuation of International Application No. PCT/CN2019/081635, filed on Apr. 6, 2019, which claims priority to Chinese Patent Application No. 201810942481.6, filed on Aug. 17, 2018 and Chinese Patent Application NO. 201810629423.8, filed on Jun. 19, 2018. All of the aforementioned patent applications are hereby incorporated by reference in their entireties.

TECHNICAL FIELD

This application relates to the field of chip technologies, and in particular, to a fast equalization method, a fast equalization apparatus, a chip, and a communications system.

BACKGROUND

As specified in a peripheral component interconnect express (PCIe) bus standard or a cache coherent interconnect for accelerators (CCIX) bus standard, when a link cannot run stably for some reasons (such as chip aging or a temperature change), system software (SW) needs to repair the link. A link repair process includes link equalization (or simply referred to as "equalization"). If a link equalization process triggered by the system software consumes excessively long duration, an error may be caused, for example, system working or running times out. Therefore, an appropriate method is required to resolve the problem that the link equalization process consumes excessively long duration.

SUMMARY

This application provides a fast equalization method, to reduce duration required in a link equalization process. Further, this application further provides an apparatus and a communications system for performing the method, and a chip used in performing the method.

According to a first aspect, a fast equalization method is provided, where the method includes the following steps:

storing first equalization parameters that meet a link stability requirement and that are obtained when an $(N-a)^{th}$ time of link equalization is performed, where the first equalization parameters include a receive parameter and a transmit parameter of a primary chip and a receive parameter and a transmit parameter of a secondary chip, $N \geq 2$, $1 \leq a \leq N$, and both a and N are integers;

when determining that an $N^{th}$ time of link equalization needs to be performed, reading initial fast equalization timeout duration of the primary chip (also referred to as first initial fast equalization timeout duration) and initial fast equalization timeout duration of the secondary chip (also referred to as second initial fast equalization timeout duration), where the initial fast equalization timeout duration of the primary chip is less than or equal to equalization timeout duration that is of the primary chip in a fourth phase of equalization and that exists when the $(N-a)^{th}$ time of link equalization is performed, the initial fast equalization timeout duration of the secondary chip is less than or equal to equalization timeout duration that is of the secondary chip in a third phase of equalization and that exists when the $(N-a)^{th}$ time of link equalization is performed, both the initial fast equalization timeout duration of the primary chip and the initial fast equalization timeout duration of the secondary chip are device advertise values, and both the equalization timeout duration that is of the primary chip in the fourth phase of equalization and that exists when the $(N-a)^{th}$ time of link equalization is performed and the equalization timeout duration that is of the secondary chip in the third phase of equalization and that exists when the $(N-a)^{th}$ time of link equalization is performed are hardware initialize values; and configuring first fast equalization timeout duration based on the initial fast equalization timeout duration of the primary chip and the initial fast equalization timeout duration of the secondary chip, and invoking the first equalization parameters, so that the primary chip and the secondary chip perform the $N^{th}$ time of link equalization based on the first fast equalization timeout duration and the first equalization parameters, where the first fast equalization timeout duration is a larger value in the initial fast equalization timeout duration of the primary chip and the initial fast equalization timeout duration of the secondary chip, and the first fast equalization timeout duration is equalization timeout duration that is of the primary chip in the third phase of equalization and that exists when the $N^{th}$ time of link equalization is performed and equalization timeout duration that is of the primary chip in the fourth phase of equalization and that exists when the $N^{th}$ time of link equalization is performed, and is equalization timeout duration that is of the secondary chip in the third phase of equalization and that exists when the $N^{th}$ time of link equalization is performed and equalization timeout duration that is of the secondary chip in the fourth phase of equalization and that exists when the $N^{th}$ time of link equalization is performed.

In an embodiment, when the $(N-a)^{th}$ time of link equalization is performed and a link is stable, equalization parameters (namely, the first equalization parameters) that meet the link stability requirement are stored. For example, in the method, system software (or a system management chip) may store the first equalization parameters into the primary chip (for example, firmware or a register of the primary chip). When determining that the $N^{th}$ time of link equalization needs to be performed, the system software first reads the initial fast equalization timeout duration of the primary chip and the initial fast equalization timeout duration of the secondary chip, determines the larger value in the initial fast equalization timeout duration of the primary chip and the initial fast equalization timeout duration of the secondary chip, and then configures the larger value as fast equalization timeout duration (namely, the first fast equalization timeout duration), and invokes the first equalization parameters. In this way, the primary chip and the secondary chip each may use the first equalization parameters as initial parameters, and perform link equalization based on the first fast equalization timeout duration. Because the first equalization parameters are parameters that are selected in the $(N-a)^{th}$ time of equalization and that relatively match the link, in a second phase (phase 1) of an equalization process, the primary chip and/or the secondary chip can quickly implement bit/symbol locking, to meet a requirement that a bit error rate of data is less than 10E-4. In a third phase (phase 2) of the equalization process, because the transmit parameter of the primary chip and the receive parameter of the secondary chip in the first equalization parameters relatively match the link, and an initial bit error rate of the link is relatively low, the secondary chip needs to slightly adjust (for example, one to two times) only the receive parameter of the secondary chip and the transmit parameter of the primary chip, to meet the link stability requirement (for example, the bit error rate is less than 10E-12). In this way, it can be ensured that the primary chip and the secondary chip complete equalization within the first fast equalization timeout duration, thereby reducing equalization timeout duration. Similarly, in a fourth phase (phase 3) of the equalization process, because the receive parameter of the primary chip and the transmit parameter of the secondary chip in the first equalization parameters relatively match the link, and the initial bit error rate of the link is relatively low, the primary chip needs to slightly adjust (for example, one to two times) only the receive parameter of the primary chip and the transmit parameter of the secondary chip, to meet the link stability requirement (for example, the bit error rate is less than 10E-12). In this way, it can be ensured that the primary chip and the secondary chip complete equalization within the first fast equalization timeout duration, thereby reducing duration required in the equalization process. After rate change is completed and the link can run stably, the primary chip and the secondary chip perform rate change to reach a higher-level rate, repeatedly use the first fast equalization timeout duration, and invoke the first equalization parameters as initial equalization parameters, to perform link equalization, until parameters that meet the link stability requirement at each rate are found again. After link equalization at all rates supported by the chip is completed, before the $N^{th}$ time of link equalization is performed for the link, the link runs at a highest rate or service data is transmitted at a highest rate that can meet the link stability requirement.

Therefore, in the fast equalization method in an embodiment of this application, when a current time of link equalization is performed, previously stored equalization parameters that meet the link stability requirement and equalization timeout duration (namely, the first fast equalization timeout duration) shorter than that in the prior art are used, so that duration of an equalization phase can be shortened. In addition, because the equalization timeout duration is relatively short, in the fast equalization method in this embodiment of this application, a probability that an entire link repair (for example, hot reset or link retrain) process is completed within is can be improved while it is ensured that a high-speed high-loss link can run stably, to avoid the following problem as much as possible: Waiting times out in the link repair process initiated by the system software, and consequently the system software considers that the link is unavailable.

It should be noted that the primary chip in this application is a chip that includes a downstream port (DSP). Sometimes, the primary chip is also referred to as a downstream port. The secondary chip in this application is a chip that includes an upstream port (USP). Sometimes, the secondary chip is also referred to as an upstream port.

It should be further noted that the first equalization parameters include receive and transmit parameters, of each of the primary chip and the secondary chip, that meet the link stability requirement at various link rates.

In an embodiment, the primary chip and the secondary chip may be connected to each other by using a PCIe bus or a CCIX bus. It can be learned that the fast equalization method provided in this embodiment is applied to a processor system in which the PCIe bus or the CCIX bus is used.

Further, in the processor system to which the PCIe bus is applied, the primary chip is a root complex (RC) or a switch chip, and the secondary chip is an endpoint (EP) independent of the primary chip. It should be learned that, the switch chip may be a primary chip in some cases, or may be a secondary chip in other cases.

In the fast equalization method in an embodiment of this application, because the previously stored equalization parameters that meet the link stability requirement may be used, relatively short equalization timeout duration may be set. When waiting duration (namely, Is) that is of the system software during link repair and that is specified in a current protocol does not need to be changed, the following problem can be avoided as much as possible: Waiting times out in the link repair process initiated by the system software, and consequently the system software considers that the link is unavailable. Therefore, in the method in this embodiment of this application, compatibility of a PCIe/CCIX protocol can be well implemented, and a modification operation on various versions of the system software due to a compatibility problem can also be avoided.

In an embodiment, performing the $N^{th}$ time of link equalization includes hot reset and link retrain that are triggered by an operating system.

In the foregoing descriptions, a may be 1. Therefore, in the method in an embodiment of this application, equalization parameters that enable the link to run stably and that are obtained when link equalization is performed most recently may be used in a link equalization process triggered by hot reset or link retrain. Because the equalization parameters that enable the link to run stably and that are obtained when link equalization is performed most recently relatively match the link, and the initial bit error rate of the link is relatively low, it can be ensured that the primary chip and the secondary chip complete equalization within the first fast equalization timeout duration, thereby reducing the duration required in the equalization process.

In an embodiment, the initial fast equalization timeout duration of the primary chip is determined based on a physical layer (PHY) capability supported by the primary chip, or the initial fast equalization timeout duration of the secondary chip is determined based on a PHY capability supported by the secondary chip.

In an embodiment, before the configuring first fast equalization timeout duration based on the initial fast equalization timeout duration of the primary chip and the initial fast equalization timeout duration of the secondary chip, the method may further include:

determining whether the primary chip supports fast equalization, and determining whether the secondary chip supports the fast equalization; and correspondingly, the configuring first fast equalization timeout duration specifically includes: configuring the first fast equalization timeout duration when both the primary chip and the secondary chip support the fast equalization.

In an embodiment, whether to configure the first fast equalization timeout duration is determined based on whether the primary chip and the secondary chip support fast equalization, so that the following problem can be avoided: System disorder may be caused by configuring the first fast equalization timeout duration when the primary chip or the secondary chip does not support fast equalization.

In an embodiment, the determining whether the primary chip supports fast equalization includes: when the initial fast equalization timeout duration of the primary chip is not 0, determining that the primary chip supports the fast equalization.

In an embodiment, a register for identifying whether the primary chip supports fast equalization does not need to be specially disposed, and whether the primary chip supports fast equalization can be determined by determining whether the initial fast equalization timeout duration is 0. Therefore, a design can be simplified.

In an embodiment, the determining whether the secondary chip supports the fast equalization specifically includes: when the initial fast equalization timeout duration of the secondary chip is not 0, determining that the secondary chip supports the fast equalization.

In an embodiment, a register for identifying whether the secondary chip supports fast equalization does not need to be specially disposed, and whether the secondary chip supports fast equalization can be determined by determining whether the initial fast equalization timeout duration is 0. Therefore, a design can be simplified.

In an embodiment, the method may further include: storing second equalization parameters that meet the link stability requirement and that are obtained when the $N^{th}$ time of link equalization is performed, where the second equalization parameters include a receive parameter and a transmit parameter of the primary chip and a receive parameter and a transmit parameter of the secondary chip.

In an embodiment, the second equalization parameters that meet the link stability requirement and that are obtained when the $N^{th}$ time of link equalization is performed are stored, so that the second equalization parameters can be used in a subsequent equalization process.

In an embodiment, the method may further include: clearing the first fast equalization timeout duration.

In an embodiment, the first fast equalization timeout duration is cleared, so that fast equalization can be disabled.

In an embodiment, the method may further include: when determining that an $(N+b)^{th}$ time of link equalization needs to be performed, configuring second fast equalization timeout duration, and invoking the second equalization parameters, so that the primary chip and the secondary chip perform the $(N+b)^{th}$ time of link equalization based on the second fast equalization timeout duration and the second equalization parameters, where the second fast equalization timeout duration is equalization timeout duration that is of the primary chip in the third phase of equalization and that exists when the $(N+b)^{th}$ time of link equalization is performed and equalization timeout duration that is of the primary chip in the fourth phase of equalization and that exists when the $(N+b)^{th}$ time of link equalization is performed, and is equalization timeout duration that is of the secondary chip in the third phase of equalization and that exists when the $(N+b)^{th}$ time of link equalization is performed and equalization timeout duration that is of the secondary chip in the fourth phase of equalization and that exists when the $(N+b)^{th}$ time of link equalization is performed, the second fast equalization timeout duration is the same as the first fast equalization timeout duration, $b \geq 1$, and b is an integer.

In an embodiment, when it is determined that the $(N+b)^{th}$ time of link equalization needs to be performed, the initial fast equalization timeout duration of the primary chip and the initial fast equalization timeout duration of the secondary chip may be read first, the larger value in the initial fast equalization timeout duration of the primary chip and the initial fast equalization timeout duration of the secondary chip is determined, and then the larger value is configured as fast equalization timeout duration (namely, the second fast equalization timeout duration), and the previously stored second equalization parameters are invoked. In this way, the primary chip and the secondary chip each may use the second equalization parameters as initial parameters, and perform link equalization based on the second fast equalization timeout duration. Because the second equalization parameters relatively match the link, and the initial bit error rate of the link is relatively low, it can be ensured that the primary chip and the secondary chip complete equalization within the second fast equalization timeout duration, thereby reducing duration required in an equalization process.

Therefore, in the fast equalization method in an embodiment of this application, when a current time of link equalization is performed, previously stored equalization parameters that meet the link stability requirement and equalization timeout duration shorter than that in the prior art can be used, so that duration of an equalization phase can be shortened.

According to a second aspect, a fast equalization apparatus is provided, where the apparatus is adapted to perform the method according to any one of the first aspect or the implementations of the first aspect, and the apparatus includes a manager and a transceiver.

The manager is adapted to store first equalization parameters that meet a link stability requirement and that are obtained when an $(N-a)^{th}$ time of link equalization is performed, where the first equalization parameters include a receive parameter and a transmit parameter of a primary chip and a receive parameter and a transmit parameter of a secondary chip, $N \geq 2$, $1 \leq a \leq N$, and both a and N are integers.

The transceiver is adapted to: when the manager determines that an $N^{th}$ time of link equalization needs to be performed, read initial fast equalization timeout duration of the primary chip and initial fast equalization timeout duration of the secondary chip, where the initial fast equalization timeout duration of the primary chip is less than or equal to equalization timeout duration that is of the primary chip in a fourth phase of equalization and that exists when the $(N-a)^{th}$ time of link equalization is performed, the initial fast equalization timeout duration of the secondary chip is less than or equal to equalization timeout duration that is of the secondary chip in a third phase of equalization and that exists when the $(N-a)^{th}$ time of link equalization is performed, both the initial fast equalization timeout duration of the primary chip and the initial fast equalization timeout duration of the secondary chip are device advertise values, and both the equalization timeout duration that is of the primary chip in the fourth phase of equalization and that exists when the $(N-a)^{th}$ time of link equalization is performed and the equalization timeout duration that is of the secondary chip in the third phase of equalization and that exists when the $(N-a)^{th}$ time of link equalization is performed are hardware initialize values.

The manager is further adapted to: configure first fast equalization timeout duration based on the initial fast equalization timeout duration of the primary chip and the initial fast equalization timeout duration of the secondary chip, and invoke the first equalization parameters, so that the primary chip and the secondary chip perform the $N^{th}$ time of link equalization based on the first fast equalization timeout duration and the first equalization parameters, where the first fast equalization timeout duration is a larger value in the initial fast equalization timeout duration of the primary chip and the initial fast equalization timeout duration of the secondary chip, and the first fast equalization timeout duration is equalization timeout duration that is of the primary chip in the third phase of equalization and that exists when the $N^{th}$ time of link equalization is performed and equalization timeout duration that is of the primary chip in the fourth phase of equalization and that exists when the $N^{th}$ time of link equalization is performed, and is equalization timeout duration that is of the secondary chip in the third phase of equalization and that exists when the $N^{th}$ time of link equalization is performed and equalization timeout duration that is of the secondary chip in the fourth phase of equalization and that exists when the $N^{th}$ time of link equalization is performed.

The apparatus provided in an embodiment can be used to implement the fast equalization method according to any one of the first aspect or the possible implementations of the first aspect. According to the apparatus provided in an embodiment, previously stored equalization parameters that meet the link stability requirement and equalization timeout duration (namely, the first fast equalization timeout duration) shorter than that in the prior art can be used, so that duration of an equalization phase can be shortened. In addition, because the equalization timeout duration is relatively short, according to the apparatus in this embodiment of this application, a probability that an entire link repair (for example, hot reset or link retrain) process is completed within Is can be improved while it is ensured that a high-speed high-loss link can run stably, to avoid the following problem as much as possible: Waiting times out in the link repair process initiated by system software, and consequently the system software considers that the link is unavailable.

In an embodiment, the primary chip and the secondary chip may be connected to each other by using a PCIe bus or a CCIX bus.

In an embodiment, performing the $N^{th}$ time of link equalization includes hot reset and link retrain that are triggered by an operating system.

In an embodiment, the initial fast equalization timeout duration of the primary chip is determined based on a physical layer PHY capability supported by the primary chip, or the initial fast equalization timeout duration of the secondary chip is determined based on a PHY capability supported by the secondary chip.

In an embodiment, the manager is further adapted to: determine whether the primary chip supports fast equalization, and determine whether the secondary chip supports the fast equalization; and correspondingly, that the manager is further adapted to configure first fast equalization timeout duration specifically includes: configuring the first fast equalization timeout duration when both the primary chip and the secondary chip support the fast equalization.

In an embodiment, that the manager is further adapted to determine whether the primary chip supports fast equalization specifically includes: when the initial fast equalization timeout duration of the primary chip is not 0, determining that the primary chip supports the fast equalization.

In an embodiment, that the manager is further adapted to determine whether the secondary chip supports the fast equalization specifically includes:

when the initial fast equalization timeout duration of the secondary chip is not 0, determining that the secondary chip supports the fast equalization.

In an embodiment, the manager is further adapted to store second equalization parameters that meet the link stability requirement and that are obtained when the $N^{th}$ time of link equalization is performed, where the second equalization parameters include a receive parameter and a transmit parameter of the primary chip and a receive parameter and a transmit parameter of the secondary chip.

In an embodiment, the manager is further adapted to clear the first fast equalization timeout duration.

In an embodiment, the manager is further adapted to: when determining that an $(N+b)^{th}$ time of link equalization needs to be performed, configure second fast equalization timeout duration, and invoke the second equalization parameters, so that the primary chip and the secondary chip perform the $(N+b)^{th}$ time of link equalization based on the second fast equalization timeout duration and the second equalization parameters, where the second fast equalization timeout duration is equalization timeout duration that is of the primary chip in the third phase of equalization and that exists when the $(N+b)^{th}$ time of link equalization is performed and equalization timeout duration that is of the primary chip in the fourth phase of equalization and that exists when the $(N+b)^{th}$ time of link equalization is performed, and is equalization timeout duration that is of the secondary chip in the third phase of equalization and that exists when the $(N+b)^{th}$ time of link equalization is performed and equalization timeout duration that is of the secondary chip in the fourth phase of equalization and that exists when the $(N+b)^{th}$ time of link equalization is performed, the second fast equalization timeout duration is the same as the first fast equalization timeout duration, $b \geq 1$, and b is an integer.

It should be understood that, for beneficial effects of the second aspect, refer to beneficial effects corresponding to related implementations of the first aspect. Details are not described herein again.

According to a third aspect, a fast equalization apparatus is provided, where the apparatus is also adapted to perform the fast equalization method according to any one of the first aspect or the implementations of the first aspect, and the apparatus includes a storage unit, a read unit, a determining unit, and a configuration and invoking unit.

The storage unit is adapted to store first equalization parameters that meet a link stability requirement and that are obtained when an $(N-a)^{th}$ time of link equalization is performed, where the first equalization parameters include a receive parameter and a transmit parameter of a primary chip and a receive parameter and a transmit parameter of a secondary chip, $N \geq 2$, $1 \leq a \leq N$, and both a and N are integers.

The read unit is adapted to: when the determining unit determines that an $N^{th}$ time of link equalization needs to be performed, read initial fast equalization timeout duration of the primary chip and initial fast equalization timeout duration of the secondary chip, where the initial fast equalization timeout duration of the primary chip is less than or equal to equalization timeout duration that is of the primary chip in a fourth phase of equalization and that exists when the $(N-a)^{th}$ time of link equalization is performed, the initial fast equalization timeout duration of the secondary chip is less than or equal to equalization timeout duration that is of the secondary chip in a third phase of equalization and that exists when the $(N-a)^{th}$ time of link equalization is performed, both the initial fast equalization timeout duration of the primary chip and the initial fast equalization timeout duration of the secondary chip are device advertise values, and both the equalization timeout duration that is of the primary chip in the fourth phase of equalization and that exists when the $(N-a)^{th}$ time of link equalization is performed and the equalization timeout duration that is of the secondary chip in the third phase of equalization and that exists when the $(N-a)^{th}$ time of link equalization is performed are hardware initialize values.

The configuration and invoking unit is adapted to: configure first fast equalization timeout duration based on the initial fast equalization timeout duration of the primary chip and the initial fast equalization timeout duration of the secondary chip, and invoke the first equalization parameters, so that the primary chip and the secondary chip perform the $N^{th}$ time of link equalization, where the first fast equalization timeout duration is a larger value in the initial fast equalization timeout duration of the primary chip and the initial fast equalization timeout duration of the secondary chip, and the first fast equalization timeout duration is equalization timeout duration that is of the primary chip in the third phase of equalization and that exists when the $N^{th}$ time of link equalization is performed and equalization timeout duration that is of the primary chip in the fourth phase of equalization and that exists when the $N^{th}$ time of link equalization is performed, and is equalization timeout duration that is of the secondary chip in the third phase of equalization and that exists when the $N^{th}$ time of link equalization is performed and equalization timeout duration that is of the secondary chip in the fourth phase of equalization and that exists when the $N^{th}$ time of link equalization is performed.

The apparatus provided in this embodiment can be used to implement the fast equalization method according to any one of the first aspect or the possible implementations of the first aspect. According to the apparatus provided in this embodiment, previously stored equalization parameters that meet the link stability requirement and equalization timeout duration (namely, the first fast equalization timeout duration) shorter than that in the prior art can be used, so that duration of an equalization phase can be shortened. In addition, because the equalization timeout duration is relatively short, according to the apparatus in this embodiment of this application, a probability that an entire link repair (for example, hot reset or link retrain) process is completed within Is can be improved while it is ensured that a high-speed high-loss link can run stably, to avoid the following problem as much as possible: Waiting times out in the link repair process initiated by system software, and consequently the system software considers that the link is unavailable.

In an embodiment, the primary chip and the secondary chip may be connected to each other by using a PCIe bus or a CCIX bus.

In an embodiment, the case in which the $N^{th}$ time of link equalization needs to be performed includes hot reset and link retrain that are triggered by an operating system.

In an embodiment, the initial fast equalization timeout duration of the primary chip is determined based on a physical layer (PHY) capability supported by the primary chip, or the initial fast equalization timeout duration of the secondary chip is determined based on a PHY capability supported by the secondary chip.

In an embodiment, the determining unit is further adapted to: determine whether the primary chip supports fast equalization, and determine whether the secondary chip supports the fast equalization; and correspondingly, that the configuration and invoking unit is adapted to configure first fast equalization timeout duration based on the initial fast equalization timeout duration of the primary chip and the initial fast equalization timeout duration of the secondary chip specifically includes: configuring the first fast equalization timeout duration when both the primary chip and the secondary chip support the fast equalization.

In an embodiment, that the determining unit is further adapted to determine whether the primary chip supports fast equalization specifically includes: when the initial fast equalization timeout duration of the primary chip is not 0, determining that the primary chip supports the fast equalization.

In an embodiment, that the determining unit is further adapted to determine whether the secondary chip supports the fast equalization specifically includes: when the initial fast equalization timeout duration of the secondary chip is not 0, determining that the secondary chip supports the fast equalization.

In an embodiment, the storage unit is further adapted to store second equalization parameters that meet the link stability requirement and that are obtained when the $N^{th}$ time of link equalization is performed, where the second equalization parameters include a receive parameter and a transmit parameter of the primary chip and a receive parameter and a transmit parameter of the secondary chip.

In an embodiment, the configuration and invoking unit is further adapted to clear the first fast equalization timeout duration.

In an embodiment, the configuration and invoking unit is further adapted to: when the determining unit determines that an $(N+b)^{th}$ time of link equalization needs to be performed, configure second fast equalization timeout duration, and invoke the second equalization parameters, so that the primary chip and the secondary chip perform the $(N+b)^{th}$ time of link equalization based on the second fast equalization timeout duration and the second equalization parameters, where the second fast equalization timeout duration is equalization timeout duration that is of the primary chip in the third phase of equalization and that exists when the $(N+b)^{th}$ time of link equalization is performed and equalization timeout duration that is of the primary chip in the fourth phase of equalization and that exists when the $(N+b)^{th}$ time of link equalization is performed, and is equalization timeout duration that is of the secondary chip in the third phase of equalization and that exists when the $(N+b)^{th}$ time of link equalization is performed and equalization timeout duration that is of the secondary chip in the fourth phase of equalization and that exists when the $(N+b)^{th}$ time of link equalization is performed, the second fast equalization timeout duration is the same as the first fast equalization timeout duration, $b \geq 1$, and b is an integer.

It should be understood that, for beneficial effects of the third aspect, refer to beneficial effects corresponding to related implementations of the first aspect. Details are not described herein again.

According to a fourth aspect, a fast equalization apparatus is provided, where the apparatus is also adapted to perform the fast equalization method according to any one of the first aspect or the implementations of the first aspect, the apparatus includes a central processing unit (CPU) and a memory, and the CPU is adapted to execute code stored in the memory, to implement a function of the apparatus in this embodiment.

The memory is adapted to store first equalization parameters that meet a link stability requirement and that are obtained when an $(N-a)^{th}$ time of link equalization is performed, where the first equalization parameters include a receive parameter and a transmit parameter of a primary chip and a receive parameter and a transmit parameter of a secondary chip, $N \geq 2$, $1 \leq a \leq N$, and both a and N are integers.

The CPU is adapted to: when determining that an $N^{th}$ time of link equalization needs to be performed, read initial fast equalization timeout duration of the primary chip and initial fast equalization timeout duration of the secondary chip, where the initial fast equalization timeout duration of the primary chip is less than or equal to equalization timeout duration that is of the primary chip in a fourth phase of equalization and that exists when the $(N-a)^{th}$ time of link equalization is performed, the initial fast equalization timeout duration of the secondary chip is less than or equal to equalization timeout duration that is of the secondary chip in a third phase of equalization and that exists when the $(N-a)^{th}$ time of link equalization is performed, both the initial fast equalization timeout duration of the primary chip and the initial fast equalization timeout duration of the secondary chip are device advertise values, and both the equalization timeout duration that is of the primary chip in the fourth phase of equalization and that exists when the $(N-a)^{th}$ time of link equalization is performed and the equalization timeout duration that is of the secondary chip in the third phase of equalization and that exists when the $(N-a)^{th}$ time of link equalization is performed are hardware initialize values.

The CPU is adapted to: configure first fast equalization timeout duration based on the initial fast equalization timeout duration of the primary chip and the initial fast equalization timeout duration of the secondary chip, and invoke the first equalization parameters, so that the primary chip and the secondary chip perform the $N^{th}$ time of link equalization, where the first fast equalization timeout duration is a larger value in the initial fast equalization timeout duration of the primary chip and the initial fast equalization timeout duration of the secondary chip, and the first fast equalization timeout duration is equalization timeout duration that is of the primary chip in the third phase of equalization and that exists when the $N^{th}$ time of link equalization is performed and equalization timeout duration that is of the primary chip in the fourth phase of equalization and that exists when the $N^{th}$ time of link equalization is performed, and is equalization timeout duration that is of the secondary chip in the third phase of equalization and that exists when the $N^{th}$ time of link equalization is performed and equalization timeout duration that is of the secondary chip in the fourth phase of equalization and that exists when the $N^{th}$ time of link equalization is performed.

The apparatus provided in this embodiment can be used to implement the fast equalization method according to any one of the first aspect or the possible implementations of the first aspect. According to the apparatus provided in this embodiment, previously stored equalization parameters that meet the link stability requirement and equalization timeout duration (namely, the first fast equalization timeout duration) shorter than that in the prior art can be used, so that duration of an equalization phase can be shortened. In addition, because the equalization timeout duration is relatively short, according to the apparatus in this embodiment of this application, a probability that an entire link repair (for example, hot reset or link retrain) process is completed within is can be improved while it is ensured that a high-speed high-loss link can run stably, to avoid the following problem as much as possible: Waiting times out in the link repair process initiated by system software, and consequently the system software considers that the link is unavailable.

According to a fifth aspect, a chip is provided, where the chip may be the primary chip mentioned in any one of the first aspect or the implementations of the first aspect, any one of the second aspect or the implementations of the second aspect, or any one of the third aspect or the implementations of the third aspect, and the chip includes a transceiver, a first register, a second register, a third register, and a manager.

The transceiver is adapted to send first equalization parameters or a receive parameter and a transmit parameter of the chip in the first equalization parameters, where the first equalization parameters are parameters that meet a link stability requirement and that are obtained when an $(N-a)^{th}$ time of link equalization is performed, the first equalization parameters include the receive parameter and the transmit parameter of the chip and a receive parameter and a transmit parameter of a peer chip, $N \geq 2$, $1 \leq a \leq N$, and both a and N are integers.

The first register is adapted to store initial fast equalization timeout duration of the chip, where the initial fast equalization timeout duration of the chip is less than or equal to equalization timeout duration that is of the chip in a fourth phase of equalization and that exists when the $(N-a)^{th}$ time of link equalization is performed, the initial fast equalization timeout duration of the chip is a device advertise value, and the equalization timeout duration that is of the chip in the fourth phase of equalization and that exists when the $(N-a)^{th}$ time of link equalization is performed is a hardware initialize value.

The transceiver is further adapted to: send the initial fast equalization timeout duration of the chip, and receive first fast equalization timeout duration and the first equalization parameters, where the first fast equalization timeout duration is a larger value in the initial fast equalization timeout duration of the chip and initial fast equalization timeout duration of the peer chip, the initial fast equalization timeout duration of the peer chip is less than or equal to equalization timeout duration that is of the peer chip in a third phase of equalization and that exists when the $(N-a)^{th}$ time of link equalization is performed, the equalization timeout duration that is of the peer chip in the third phase of equalization and that exists when the $(N-a)^{th}$ time of link equalization is performed is a hardware initialize value, and the initial fast equalization timeout duration of the peer chip is a device advertise value.

The manager is adapted to: set the first equalization parameters in the second register, and set the first fast equalization timeout duration in the third register.

The manager is further adapted to: when the transceiver receives first link repair indication information, perform an $N^{th}$ time of link equalization based on the first fast equalization timeout duration and the first equalization parameters, where the first link repair indication information is used to trigger the $N^{th}$ time of link equalization, and the first fast equalization timeout duration is equalization timeout duration that is of the chip in the third phase of equalization and that exists when the $N^{th}$ time of link equalization is performed and equalization timeout duration that is of the chip in the fourth phase of equalization and that exists when the $N^{th}$ time of link equalization is performed, and is equalization timeout duration that is of the peer chip in the third phase of equalization and that exists when the $N^{th}$ time of link equalization is performed and equalization timeout duration that is of the peer chip in the fourth phase of equalization and that exists when the $N^{th}$ time of link equalization is performed.

In an embodiment, when the $(N-a)^{th}$ time of link equalization is performed, after a link runs stably, the chip sends, to system software (or a system management chip), parameters of the chip (or parameters of the chip and parameters of the peer chip) that meet the link stability requirement. The system software may store the received parameters into the chip or an external storage medium, or the system software stores the received parameters of the chip into the chip. When determining that the $N^{th}$ time of link equalization needs to be performed, the system software reads the initial fast equalization timeout duration of the chip from the first register of the chip, determines the larger value in the initial fast equalization timeout duration of the chip and the initial fast equalization timeout duration of the peer chip, and writes the larger value (namely, the first fast equalization timeout duration) into the third register of the chip. In addition, the system software reads the foregoing stored parameters from the external storage medium or the chip, and then writes the parameters into the second register. Then, the chip may perform the $N^{th}$ time of link equalization based on the foregoing parameters stored in the second register and the first fast equalization timeout duration stored in the third register.

It should be understood that the external storage medium is a storage medium at a location other than the chip, the peer chip, and the system software.

The chip in this embodiment can implement the method according to any one of the first aspect or the possible implementations of the first aspect, and therefore can shorten duration of an equalization phase.

It should be understood that the second register is a register that stores initial parameters used for link equalization. Before the second register stores the first equalization parameters or the transmit parameter and the receive parameter of the chip in the first equalization parameters, the second register stores a hardware initialize value.

In addition, it should be noted that the transceiver may not send the first equalization parameters or the receive parameter and the transmit parameter of the chip in the first equalization parameters. In this case, the chip may store the first equalization parameters or the receive parameter and the transmit parameter of the chip in the first equalization parameters into a register or firmware of the chip. Further, if the chip has a CPU or a component or unit with a function that can be implemented by a CPU, the transceiver may not receive the first equalization parameters or the receive parameter and the transmit parameter of the chip in the first equalization parameters, but first reads the foregoing parameters stored in the register or the firmware of the chip, and then writes the foregoing parameters into a location that is in the second register and that is used to store the initial parameters.

In an embodiment, the transceiver is further adapted to send second equalization parameters that meet the link stability requirement and that are obtained when the $N^{th}$ time of link equalization is performed, or a receive parameter and a transmit parameter of the chip in the second equalization parameters, where the second equalization parameters include the receive parameter and the transmit parameter of the chip and a receive parameter and a transmit parameter of the peer chip.

It should be noted that the transceiver may not send the second equalization parameters or the receive parameter and the transmit parameter of the chip in the second equalization parameters. In this case, the chip may store the second equalization parameters or the receive parameter and the transmit parameter of the chip in the second equalization parameters into the register or the firmware of the chip.

In an embodiment, the transceiver is further adapted to receive clearing indication information, where the clearing indication information is used to clear the first fast equalization timeout duration; and the manager is further adapted to clear the first fast equalization timeout duration based on the clearing indication information.

In an embodiment, the transceiver is further adapted to receive second fast equalization timeout duration and the second equalization parameters, where the second fast equalization timeout duration is the same as the first fast equalization timeout duration. The manager is further adapted to: set the second equalization parameters in the second register, and set the second fast equalization timeout duration in the third register; and when the transceiver receives second link repair indication information, perform an $(N+b)^{th}$ time of link equalization based on the second fast equalization timeout duration and the second equalization parameters, where the second link repair indication information is used to trigger the $(N+b)^{th}$ time of link equalization, the second fast equalization timeout duration is equalization timeout duration that is of the chip in the third phase of equalization and that exists when the $(N+b)^{th}$ time of link equalization is performed and equalization timeout duration that is of the chip in the fourth phase of equalization and that exists when the $(N+b)^{th}$ time of link equalization is performed, and is equalization timeout duration that is of the peer chip in the third phase of equalization and that exists when the $(N+b)^{th}$ time of link equalization is performed and equalization timeout duration that is of the peer chip in the fourth phase of equalization and that exists when the $(N+b)^{th}$ time of link equalization is performed, $b \geq 1$, and b is an integer.

It should be understood that, in the third register, a location that is used to store the second fast equalization timeout duration is the same as a location that is used to store the first fast equalization timeout duration. In the second register, a location that is used to store the first equalization parameters (or the receive parameter and the transmit parameter of the chip in the first equalization parameters) may be the same as or different from a location that is used to store the second equalization parameters (or the receive parameter and the transmit parameter of the chip in the second equalization parameters). When the two locations are different, either the first equalization parameters or the second equalization parameters may be used as the initial parameters.

According to a sixth aspect, a chip is provided, where the chip may be the secondary chip mentioned in any one of the first aspect or the implementations of the first aspect, any one of the second aspect or the implementations of the second aspect, or any one of the third aspect or the implementations of the third aspect, and the chip includes a transceiver, a first register, a second register, a third register, and a manager.

The transceiver is adapted to send first equalization parameters or a receive parameter and a transmit parameter of the chip in the first equalization parameters, where the first equalization parameters are parameters that meet a link stability requirement and that are obtained when an $(N-a)^{th}$ time of link equalization is performed, the first equalization parameters include the receive parameter and the transmit parameter of the chip and a receive parameter and a transmit parameter of a peer chip, $N \geq 2$, $1 \leq a \leq N$, and both a and N are integers.

The first register is adapted to store initial fast equalization timeout duration of the chip, where the initial fast equalization timeout duration of the chip is less than or equal to equalization timeout duration that is of the chip in a third phase of equalization and that exists when the $(N-a)^{th}$ time of link equalization is performed, the initial fast equalization timeout duration of the chip is a device advertise value, and the equalization timeout duration that is of the chip in the third phase of equalization and that exists when the $(N-a)^{th}$ time of link equalization is performed is a hardware initialize value.

The transceiver is further adapted to: send the initial fast equalization timeout duration of the chip, and receive first fast equalization timeout duration and the receive parameter and the transmit parameter of the chip in the first equalization parameters, where the first fast equalization timeout duration is a larger value in the initial fast equalization timeout duration of the chip and initial fast equalization timeout duration of the peer chip, the initial fast equalization timeout duration of the peer chip is less than or equal to equalization timeout duration that is of the peer chip in a fourth phase of equalization and that exists when the $(N-a)^{th}$ time of link equalization is performed, the equalization timeout duration that is of the peer chip in the fourth phase of equalization and that exists when the $(N-a)^{th}$ time of link equalization is performed is a hardware initialize value, and the initial fast equalization timeout duration of the peer chip is a device advertise value.

The manager is adapted to: set the receive parameter and the transmit parameter of the chip in the first equalization parameters in the second register, and set the first fast equalization timeout duration in the third register.

The manager is further adapted to: when the transceiver receives first link repair indication information, perform an $N^{th}$ time of link equalization based on the first fast equalization timeout duration and the receive parameter and the transmit parameter of the chip in the first equalization parameters, where the first link repair indication information is used to trigger the $N^{th}$ time of link equalization, and the first fast equalization timeout duration is equalization timeout duration that is of the chip in the third phase of equalization and that exists when the $N^{th}$ time of link equalization is performed and equalization timeout duration that is of the chip in the fourth phase of equalization and that exists when the $N^{th}$ time of link equalization is performed, and is equalization timeout duration that is of the peer chip in the third phase of equalization and that exists when the $N^{th}$ time of link equalization is performed and equalization timeout duration that is of the peer chip in the fourth phase of equalization and that exists when the $N^{th}$ time of link equalization is performed.

In an embodiment, when the $(N-a)^{th}$ time of link equalization is performed, after a link runs stably, the chip sends, to system software (or a system management chip), parameters of the chip (or parameters of the chip and parameters of the peer chip) that meet the link stability requirement. The system software may store the received parameters into the chip, an external storage medium, or the peer chip, or the system software stores the received parameters of the chip into the chip. When determining that the $N^{th}$ time of link equalization needs to be performed, the system software reads the initial fast equalization timeout duration of the chip from the first register of the chip, determines the larger value in the initial fast equalization timeout duration of the chip and the initial fast equalization timeout duration of the peer chip, and stores the larger value (namely, the first fast equalization timeout duration) into the third register of the chip. In addition, the system software reads the foregoing stored parameters from the external storage medium, the chip, or the peer chip, and then writes the parameters into the second register. Then, the chip may perform the $N^{th}$ time of link equalization based on the foregoing parameters stored in the second register and the first fast equalization timeout duration stored in the third register.

It should be understood that the external storage medium is a storage medium at a location other than the chip, the peer chip, and the system software.

The chip in this embodiment can implement the method according to any one of the first aspect or the possible implementations of the first aspect, and therefore shorten duration of an equalization phase.

It should be understood that the second register is a register that stores initial parameters used for link equalization. Before the second register stores the first equalization parameters or the transmit parameter and the receive parameter of the chip in the first equalization parameters, the second register stores a hardware initialize value.

In addition, it should be noted that the transceiver may not send the first equalization parameters or the receive parameter and the transmit parameter of the chip in the first equalization parameters. In this case, the chip may store the first equalization parameters or the receive parameter and the transmit parameter of the chip in the first equalization parameters into a register or firmware of the chip. Further, if the chip has a CPU or a component or unit with a function that can be implemented by a CPU, the transceiver may not receive the first equalization parameters or the receive parameter and the transmit parameter of the chip in the first equalization parameters, but first reads the foregoing parameters stored in the register or the firmware of the chip, and then writes the foregoing parameters into a location that is in the second register and that is used to store the initial parameters.

In an embodiment, the transceiver is further adapted to send second equalization parameters that meet the link stability requirement and that are obtained when the $N^{th}$ time of link equalization is performed, or a receive parameter and a transmit parameter of the chip in the second equalization parameters, where the second equalization parameters include the receive parameter and the transmit parameter of the chip and a receive parameter and a transmit parameter of the peer chip.

It should be noted that the transceiver may not send the second equalization parameters or the receive parameter and the transmit parameter of the chip in the second equalization parameters. In this case, the chip may store the second equalization parameters or the receive parameter and the transmit parameter of the chip in the second equalization parameters into the register or the firmware of the chip.

In an embodiment, the transceiver is further adapted to receive clearing indication information, where the clearing indication information is used to clear the first fast equalization timeout duration; and the manager is further adapted to clear the first fast equalization timeout duration based on the clearing indication information.

In an embodiment, the transceiver is further adapted to receive second fast equalization timeout duration and the receive parameter and the transmit parameter of the chip in the second equalization parameters, where the second fast equalization timeout duration is the same as the first fast equalization timeout duration. The manager is further adapted to: set the receive parameter and the transmit parameter of the chip in the second equalization parameters in the second register, and set the second fast equalization timeout duration in the third register; and when the transceiver receives second link repair indication information, perform an $(N+b)^{th}$ time of link equalization based on the second fast equalization timeout duration and the receive parameter and the transmit parameter of the chip in the second equalization parameters, where the second link repair indication information is used to trigger the $(N+b)^{th}$ time of link equalization, the second fast equalization timeout duration is equalization timeout duration that is of the chip in the third phase of equalization and that exists when the $(N+b)^{th}$ time of link equalization is performed and equalization timeout duration that is of the chip in the fourth phase of equalization and that exists when the $(N+b)^{th}$ time of link equalization is performed, and is equalization timeout duration that is of the peer chip in the third phase of equalization and that exists when the $(N+b)^{th}$ time of link equalization is performed and equalization timeout duration that is of the peer chip in the fourth phase of equalization and that exists when the $(N+b)^{th}$ time of link equalization is performed, $b \geq 1$, and b is an integer.

It should be understood that, in the third register, a location that is used to store the second fast equalization timeout duration is the same as a location that is used to store the first fast equalization timeout duration. In the second register, a location that is used to store the first equalization parameters (or the receive parameter and the transmit parameter of the chip in the first equalization parameters) may be the same as or different from a location that is used to store the second equalization parameters (or the receive parameter and the transmit parameter of the chip in the second equalization parameters). When the two locations are different, either the first equalization parameters or the second equalization parameters may be used as the initial parameters.

According to a seventh aspect, a communications system is provided, where the communications system includes system software, a primary chip, and a secondary chip. The primary chip may be the chip provided in any one of the fifth aspect or the possible implementations of the fifth aspect, and the secondary chip may be the chip provided in any one of the sixth aspect or the possible implementations of the sixth aspect. The primary chip and the secondary chip are connected to each other by using a peripheral component interconnect express PCIe bus or a cache coherent interconnect for accelerators CCIX bus. The system software may implement the method in any one of the first aspect or the possible implementations of the first aspect.

For example, the system software may be adapted to: store first equalization parameters that meet a link stability requirement and that are obtained when an $(N-a)^{th}$ time of link equalization is performed, where the first equalization parameters include a receive parameter and a transmit parameter of the primary chip and a receive parameter and a transmit parameter of the secondary chip, $N \geq 2$, $1 \leq a \leq N$, and both a and N are integers;

when determining that an $N^{th}$ time of link equalization needs to be performed, read initial fast equalization timeout duration of the primary chip and initial fast equalization timeout duration of the secondary chip, where the initial fast equalization timeout duration of the primary chip is less than or equal to equalization timeout duration that is of the primary chip in a fourth phase of equalization and that exists when the $(N-a)^{th}$ time of link equalization is performed, the initial fast equalization timeout duration of the secondary chip is less than or equal to equalization timeout duration that is of the secondary chip in a third phase of equalization and that exists when the $(N-a)^{th}$ time of link equalization is performed, both the initial fast equalization timeout duration of the primary chip and the initial fast equalization timeout duration of the secondary chip are device advertise values, and both the equalization timeout duration that is of the primary chip in the fourth phase of equalization and that exists when the $(N-a)^{th}$ time of link equalization is performed and the equalization timeout duration that is of the secondary chip in the third phase of equalization and that exists when the $(N-a)^{th}$ time of link equalization is performed are hardware initialize values; and configure first fast equalization timeout duration based on the initial fast equalization timeout duration of the primary chip and the initial fast equalization timeout duration of the secondary chip, and invoke the first equalization parameters, so that the primary chip and the secondary chip perform the $N^{th}$ time of link equalization based on the first fast equalization timeout duration and the first equalization parameters, where the first fast equalization timeout duration is a larger value in the initial fast equalization timeout duration of the primary chip and the initial fast equalization timeout duration of the secondary chip, and the first fast equalization timeout duration is equalization timeout duration that is of the primary chip in the third phase of equalization and that exists when the $N^{th}$ time of link equalization is performed and equalization timeout duration that is of the primary chip in the fourth phase of equalization and that exists when the $N^{th}$ time of link equalization is performed, and is equalization timeout duration that is of the secondary chip in the third phase of equalization and that exists when the $N^{th}$ time of link equalization is performed and equalization timeout duration that is of the secondary chip in the fourth phase of equalization and that exists when the $N^{th}$ time of link equalization is performed.

It should be understood that, for beneficial effects of the sixth aspect or the possible implementations of the sixth aspect, refer to beneficial effects of the foregoing associated embodiments. Details are not described herein again.

DESCRIPTION OF EMBODIMENTS

PCIe is a high-speed serial computer expansion bus standard, and is a type of computer bus standard PCI. PCIe follows a programming concept and communication standard of an existing PCI bus. A PCIe bus uses a high-speed serial point-to-point dual-channel high-bandwidth transmission manner, and therefore has a faster transmission rate than the PCI bus. A CCIX bus is based on a same physical architecture as the PCIe bus. The physical architecture includes an electrical sub-block and a logical sub-block. In addition, the CCIX bus supports transmission rates of PCIe 1.0, PCIe 2.0, PCIe 3.0, and PCIe 4.0.

It should be noted that the PCIe/CCIX bus may be applied not only to internal interconnection but also to peripheral interconnection. It should be noted that in this application, the PCIe/CCIX bus means the PCIe bus or the CCIX bus.

The following uses only a processor system (or may also be referred to as a "PCIe system") to which the PCIe bus is applied as an example to describe the solutions in this application. It should be learned that a processor system to which the CCIX bus is applied also has a same or similar feature. For details, refer to the following descriptions of the processor system to which the PCIe bus is applied. Therefore, details are not described again.

Figure 1:
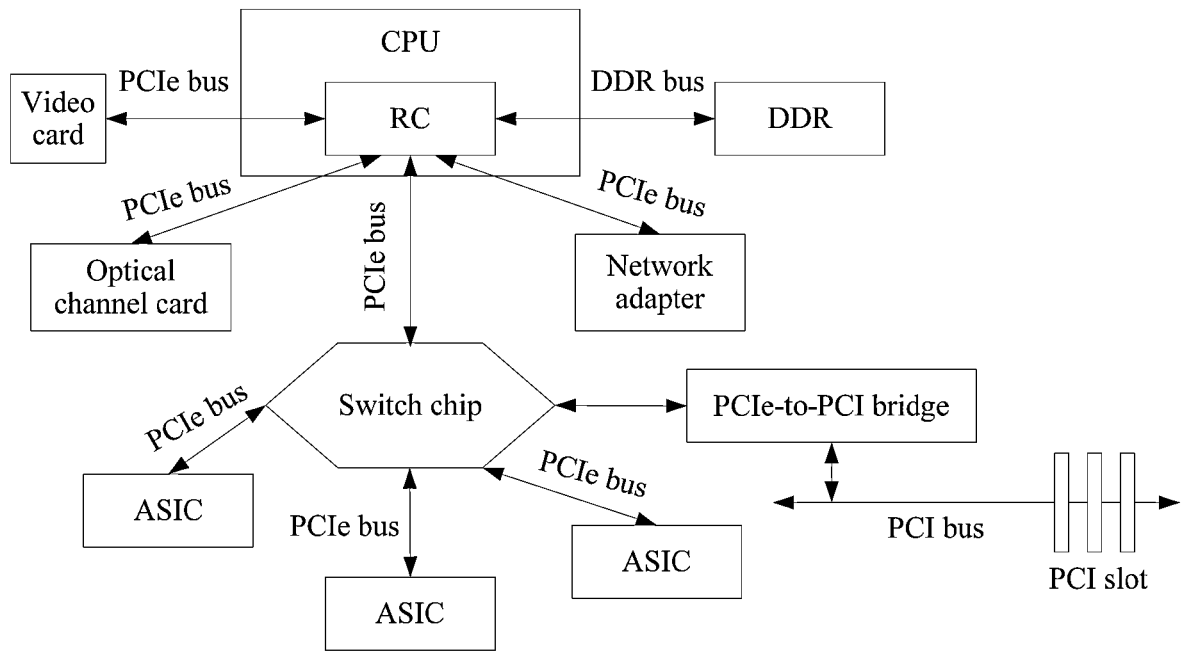
FIG. 1 is a schematic structural diagram of a processor system to which a PCIe bus is applied according to this application.

FIG. 1 shows a processor system to which a PCIe bus is applied. Referring to FIG. 1, the system includes a root complex (RC), a switch chip (switch), a PCIe-to-PCI bridge, and the like.

Specifically, the RC is also referred to as a root controller of the system, and is usually integrated into a central processing unit (CPU). The RC usually includes a plurality of ports. The RC may be connected to one component through each of the plurality of ports. The plurality of ports may include a plurality of ports (briefly referred to as PCIe ports) that are adapted to be connected to a PCIe bus. The RC may be connected to an endpoint through a PCIe port. Naturally, the RC and the endpoint are connected to each other by using the PCIe bus. For example, as shown in FIG. 1, the endpoint may be a video card, a network adapter, an optical channel card, a switch, an application-specific integrated circuit (ASIC), or the like. In the processor system shown in FIG. 1, the RC and a DDR (double data rate) are connected to each other by using a DDR bus. Therefore, a port that is on the RC and that is connected to the DDR is not a PCIe port. Therefore, the plurality of ports of the RC may be all or partially PCIe ports.

The switch is adapted to perform link expansion on the RC. Specifically, the switch and the RC are connected to each other by using the PCIe bus. In addition, the switch has a plurality of ports, and the switch may be connected to an EP through one port by using the PCIe bus. Therefore, the RC may be connected to a plurality of endpoints through one port based on the switch. As shown in FIG. 1, the switch has three ports. The switch may be connected to one ASIC through any one of the three ports by using the PCIe bus.

The PCIe-to-PCI bridge is used for bridging, and is used to implement conversion between a PCIe bus and a PCI bus, to be compatible with an original endpoint that supports the PCI bus. As shown in FIG. 1, one end of a PCIe-to-PCI bridge is connected to the switch by using the PCIe bus, and the other end is connected to the PCI bus. Further, FIG. 1 further shows a plurality of PCI slots that support a PCI bus standard. A chip or a card inserted into the PCI slot can be connected to the PCIe-to-PCI bridge by using the PCI bus, and is further connected to the CPU by using the switch.

Figure 2:
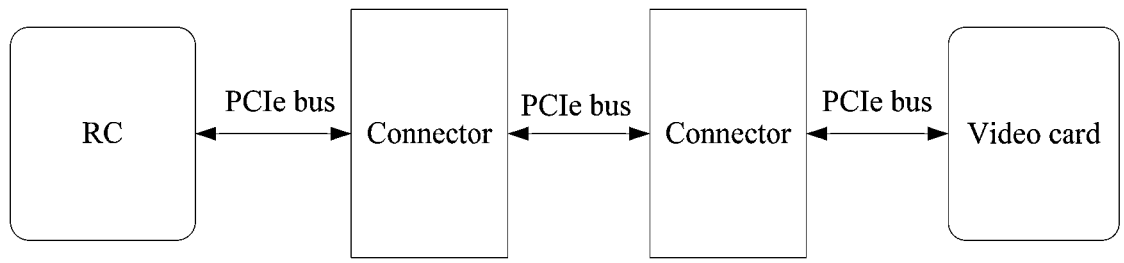
FIG. 2 is a schematic diagram of a signal channel between an RC and a video card according to this application.

It should be noted that the RC and the endpoint may be connected to each other directly by using the PCIe bus, or may be connected to each other by using the PCIe bus and a connector. As shown in FIG. 2, the RC and the video card are connected to each other successively by using a PCIe bus, a connector, a PCIe bus, a connector, and a PCIe bus. It is easy to understand that lengths of a plurality of PCIe buses located between the RC and the endpoint may be the same or different.

For ease of understanding, the "system" mentioned a plurality of times in this application is described herein. The system described in this application is a system (briefly referred to as a "PCIe/CCIX system") to which a PCIe/CCIX bus is applied. The PCIe/CCIX system may include one central processing unit CPU and one or more peripheral devices of the CPU. The PCIe/CCIX bus is used for at least one of one or more channels between the CPU and the peripheral devices of the CPU. The PCIe/CCIX system may further include a plurality of CPUs and peripheral devices of the CPUs. The PCIe/CCIX bus is used for at least one of channels between the plurality of CPUs, or the PCIe/CCIX bus is used for at least one of one or more channels between one CPU and one or more peripheral devices of the CPU.

Figure 3:
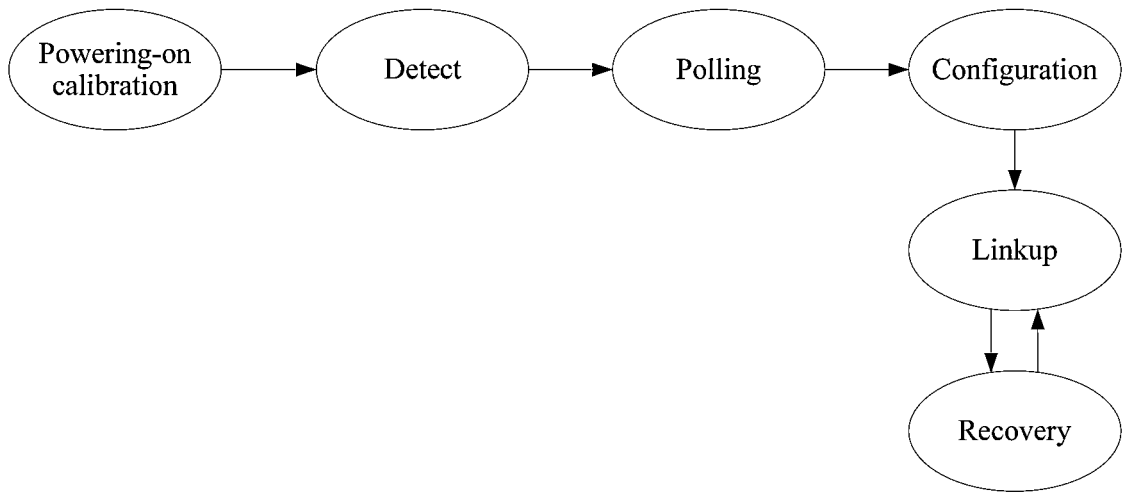
FIG. 3 is a flowchart of link establishment specified in a PCIe standard.

FIG. 3 is a flowchart of powering-on to communication connection establishment in a PCIe system. As specified in a PCIe standard, after powering-on or reset, a primary chip and a secondary chip perform powering-on calibration, and then a link state machine in each of the primary chip and the secondary chip controls a link to sequentially enter the following phases: a detect phase, a polling phase, a configuration phase, a linkup phase, and a recovery phase. Specifically, in the detect phase, the primary chip and the secondary chip each detect whether a peer is present. After it is detected that the peer is present, the polling phase is entered. In this phase, bit and symbol locking and channel polarity determining are mainly performed. Then, the configuration phase is entered, to determine a link bandwidth and a link number, and perform channel-to-channel phase compensation and the like. After configuration is completed, the link runs to the linkup phase at a low rate, that is, a connection is established between the primary chip and the secondary chip. Subsequently, the system enters the recovery phase to perform rate switching and equalization.

Equalization in PCIe/CCIX is a process of optimizing parameters of an equalization circuit at all high rates (including 8 G, 16 G, and 32 G) to select a better parameter for stable running of the link. Equalization includes four phases, namely, a first phase (phase 0), a second phase (phase 1), a third phase (phase 2), and a fourth phase (phase 3).

In phase 0, the primary chip sends, to the secondary chip, initial parameters that need to be used by the secondary chip. In an embodiment of this application, maximum stay duration of an endpoint in this phase is 12 ms.

It should be noted that in the four phases of equalization, maximum stay duration of the primary chip (or the secondary chip) in any one of the four phases is equalization timeout duration of the primary chip (or the secondary chip) in this phase. For example, maximum stay duration of the primary chip in phase 3 of equalization is equalization timeout duration of the primary chip in phase 3. Maximum stay duration of the secondary chip in phase 2 of equalization is equalization timeout duration of the secondary chip in phase 2.

In phase 1, data is sent/received between the primary chip and the secondary chip at a higher rate obtained after rate change, and specified initial parameters are used for the receiving/sending operation. Specifically, in this phase, the primary chip first sends data to the secondary chip. The secondary chip stays for a while after receiving the data. After determining that a bit error rate of the data is less than 10E-4, the secondary chip enters a next phase, namely, phase 2. Before the secondary chip enters the next phase, the secondary chip feeds back one piece of information to the primary chip to indicate that the secondary chip is to enter the next phase. After receiving the information, the primary chip is also to enter the next phase. Optionally, maximum stay duration of the secondary chip in phase 1 is 12 ms, and maximum stay duration of the primary chip in phase 1 is 24 ms.

In phase 2, the secondary chip adjusts a transmit (Tx) parameter of the primary chip, and correspondingly adjusts a receive (Rx) parameter of the secondary chip, to expect the bit error rate of the link between the secondary chip and the primary chip to be less than 10E-12. If the bit error rate between the secondary chip and the primary chip does not meet the foregoing requirement within maximum stay duration of the secondary chip in phase 2, both the primary chip and the secondary chip exit an equalization process, and return to an upper-level rate (for example, return to 2.5 G if negotiation about 8 G times out). Then, after a time period, system software controls the equalization process to be performed for the link again at the rate. In a current technology, maximum stay duration of the primary chip and the maximum stay duration of the secondary chip in this phase are set by default.

In phase 3, the primary chip adjusts a transmit (Tx) parameter of the secondary chip, and correspondingly adjusts a receive (Rx) parameter of the primary chip, to expect the bit error rate of the link between the secondary chip and the primary chip to be less than 10E-12. If the bit error rate between the secondary chip and the primary chip does not meet the foregoing requirement within maximum stay duration of the primary chip in phase 3, both the primary chip and the secondary chip exit the equalization process, and return to the upper-level rate (for example, return to 2.5 G if negotiation about 8 G times out). Then, after a time period, the system software controls the equalization process to be performed for the link again at the rate. In the current technology, the maximum stay duration of the primary chip and maximum stay duration of the secondary chip in this phase are set by default.

When rate change is completed for the first time and the link can run stably, rate change is performed to reach a higher-level rate, and the foregoing rate change equalization process is repeated, until parameters that meet a link stability requirement at each rate are found. After equalization at all rates supported by the chip is completed, the link runs at a highest rate supported by the chip or service data is transmitted at a highest rate that can meet the link stability requirement.

A device is affected by factors such as an environment and chip aging in a long-term use process, and consequently a PCIe/CCIX link may be abnormal, for example, rate reduction or a bit error occurs. To enable the link to run stably continuously, the system software repairs the link according to a policy formulated in a design phase. Repairing the link is equivalent to retraining the link, and includes the equalization process. To reduce duration consumed in a link equalization process triggered by the system software, this application provides a fast equalization method. The following describes the method in detail.

It should be noted that the primary chip in this application is a chip that includes a downstream port (DSP). Sometimes, the primary chip is also briefly referred to as a downstream port. The secondary chip in this application is a chip that includes an upstream port (USP). Sometimes, the secondary chip is also briefly referred to as an upstream port. Further, with reference to FIG. 1, it may be learned that in this application, the primary chip may be an RC or a switch chip. When the primary chip is the RC, the secondary chip may be an endpoint or a switch chip. When the primary chip is the switch chip, the secondary chip may be an endpoint device. The endpoint device may be a video card, a network adapter, an optical channel card, a storage card, a switch chip, or the like. In addition, in this application, the primary chip and the secondary chip may be located in a same processor system or different processor systems. Optionally, the primary chip and the secondary chip are connected to each other by using a PCIe/CCIX bus.

Figure 4:
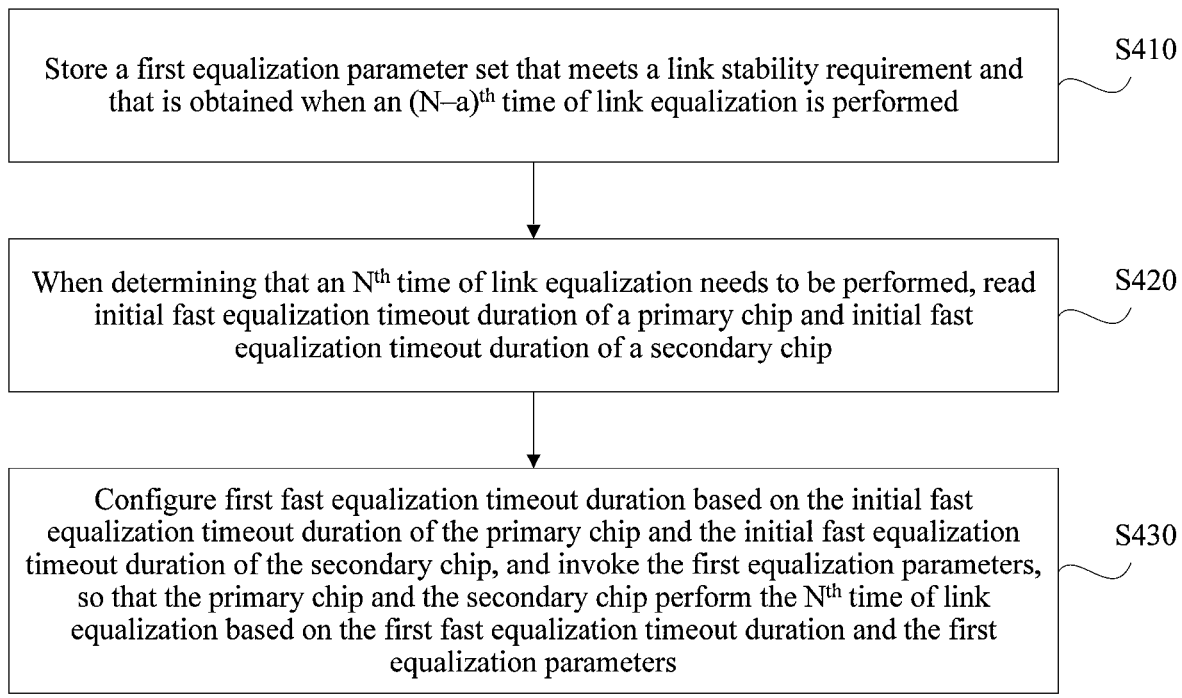
FIG. 4 is a flowchart of a fast equalization method according to this application.

FIG. 4 is a schematic flowchart of a fast equalization method according to an embodiment of this application. As shown in FIG. 4, the method mainly includes S410 to S430. The method may be performed by system software or a system management chip. The system software may be a basic input/output system (BIOS). It should be learned that the BIOS is software that is first loaded after a device is powered on. After the BIOS is loaded, an upper-layer operating system (OS) is led to be started. In a running phase of the BIOS, the BIOS may perform the fast equalization method provided in this application.

S410. Store first equalization parameters that meet a link stability requirement and that are obtained when an $(N-a)^{th}$ time of link equalization is performed.

The first equalization parameters include a receive parameter and a transmit parameter of a primary chip and a receive parameter and a transmit parameter of a secondary chip, $N \geq 2$, $1 \leq a \leq N$, and both a and N are integers.

In an embodiment, when the $(N-a)^{th}$ time of link equalization needs to be performed, for example, when link equalization after powering-on or reset needs to be performed, the primary chip and the secondary chip may perform link equalization based on the equalization process described above. When rate change is completed for the first time and a link can run stably, the system software (or the system management chip) may read parameters that meet the link stability requirement, and then store the parameters. Then, the primary chip and the secondary chip perform rate change to reach a higher-level rate, and repeat the foregoing equalization process and storage operation, until parameters that meet the link stability requirement at each rate are stored. It may be understood that parameters that meet the link stability requirement at a rate include a transmit parameter of the primary chip and a receive parameter of the secondary chip that meet the link stability requirement (for example, a bit error rate is less than 10E-12) and that are obtained in phase 2 of equalization at the rate, and a receive parameter of the primary chip and a transmit parameter of the secondary chip that meet the link stability requirement (for example, the bit error rate is less than 10E-12) and that are obtained in phase 3 of equalization at the rate.

It should be understood that the first equalization parameters include the parameters that meet the link stability requirement at each rate.

For example, after reading the first equalization parameters, the system software may store the first equalization parameters into the primary chip (for example, firmware or a register of the primary chip); or the system software may store the transmit parameter and the receive parameter of the primary chip in the first equalization parameters into the primary chip, and store the transmit parameter and the receive parameter of the secondary chip in the first equalization parameters into the secondary chip (for example, firmware or a register of the secondary chip); or the system software may store the first equalization parameters into an external storage medium. The external storage medium is a storage medium at a location other than the primary chip, the secondary chip, and the system software.

Alternatively, S410 may be performed by the primary chip and the secondary chip or one of the primary chip and the secondary chip. Specifically, after obtaining the transmit parameter and the receive parameter of the primary chip, the primary chip may store the transmit parameter and the receive parameter of the primary chip into the primary chip, for example, firmware or a register of the primary chip. After obtaining the transmit parameter and the receive parameter of the secondary chip, the secondary chip may store the transmit parameter and the receive parameter of the secondary chip into the secondary chip, for example, firmware or a register of the secondary chip. Alternatively, the primary chip (or the secondary chip) may store the first equalization parameters into the primary chip (or the secondary chip).

It should be understood that, the register that is in the primary chip and that is adapted to store the first equalization parameters or the transmit parameter and the receive parameter of the primary chip in the first equalization parameters may be a register newly added in the primary chip, or may be a register reserved in the primary chip. This is not limited in this embodiment of this application. Similarly, the register that is in the secondary chip and that is adapted to store the first equalization parameters or the transmit parameter and the receive parameter of the secondary chip in the first equalization parameters may be a register newly added in the secondary chip, or may be a register reserved in the secondary chip.

In an embodiment of this application, a>1. For example, a=2, and performing the $(N-2)^{th}$ time of link equalization may be performing link equalization during powering-on. This is not limited in this application. In this case, in a subsequent step S430, the used first equalization parameters may be parameters obtained when the $(N-2)^{th}$ time of link equalization is performed.

In another embodiment of this application, a=1. For example, performing the $(N-1)^{th}$ time of link equalization may be performing link equalization during reset. In this case, in a subsequent step S430, the used first equalization parameters may be parameters obtained when the $(N-1)^{th}$ time of link equalization is performed.

It should be noted that if the $(N-2)^{th}$ time of link equalization is further performed before the $(N-1)^{th}$ time of link equalization is performed, when the parameters obtained when the $(N-1)^{th}$ time of link equalization is performed are stored, the parameters obtained when the $(N-_2)^{th}$ time of link equalization is performed may be overwritten. Alternatively, when the parameters obtained when the $(N-1)^{th}$ time of link equalization is performed are the same as the parameters obtained when the $(N-_2)^{th}$ time of link equalization is performed, the parameters obtained when the $(N-1)^{th}$ time of link equalization is performed may not be stored.

In an embodiment, both equalization timeout duration that is of the primary chip in a third phase of equalization and that exists when the $(N-a)^{th}$ time of link equalization is performed and equalization timeout duration that is of the primary chip in a fourth phase of equalization and that exists when the $(N-a)^{th}$ time of link equalization is performed are hardware initialize (hardware initialize) values, and both equalization timeout duration that is of the secondary chip in the third phase of equalization and that exists when the $(N-a)^{th}$ time of link equalization is performed and equalization timeout duration that is of the secondary chip in the fourth phase of equalization and that exists when the $(N-a)^{th}$ time of link equalization is performed are hardware initialize values. For example, the equalization timeout duration that is of the primary chip in the third phase of equalization and that exists when the $(N-a)^{th}$ time of link equalization is performed and the equalization timeout duration that is of the primary chip in the fourth phase of equalization and that exists when the $(N-a)^{th}$ time of link equalization is performed each may be a value obtained after initialization calibration is performed on a physical layer (PHY) of the primary chip and the register is initialized. Similarly, the equalization timeout duration that is of the secondary chip in the third phase of equalization and that exists when the $(N-a)^{th}$ time of link equalization is performed and the equalization timeout duration that is of the secondary chip in the fourth phase of equalization and that exists when the $(N-a)^{th}$ time of link equalization is performed each may be a value obtained after initialization calibration is performed on a physical layer PHY of the secondary chip and the register is initialized. The process of performing initialization calibration on the PHY may be completed in a powering-on calibration process, or may be completed after the link enters a linkup phase at a low rate (for example, 2.5 G) and before rate change is performed to reach a higher rate. Further, the foregoing hardware initialize value of the primary chip may be determined based on a PHY capability of the primary chip. Similarly, the foregoing hardware initialize value of the secondary chip may be determined based on a PHY capability of the secondary chip.

It should be noted that in this application, hardware initialized equalization timeout duration in the third phase of equalization and hardware initialized equalization timeout duration in the fourth phase of equalization may be used for both equalization timeout duration in the third phase of equalization and equalization timeout duration in the fourth phase of equalization in a link equalization process triggered by non-system software.

For example, both the hardware initialized equalization timeout duration in the third phase of equalization and the hardware initialized equalization timeout duration in the fourth phase of equalization may be represented by at least 3 bits. For example, referring to FIG. 5, the equalization timeout duration in the third phase is represented by a value at bit locations 20, 21, and 22, and the equalization timeout duration in the fourth phase is represented by a value at bit locations 16, 17, and 18. For details of the value at the bit locations 16, 17, and 18, the value at the bit locations 20, 21, and 22, a correspondence between the value at the bit locations 20, 21, and 22 and the equalization timeout duration in the third phase, and a correspondence between the value at the bit locations 16, 17, and 18 and the equalization timeout duration in the fourth phase, refer to the prior art. Details are not described herein again.

S420. When determining that an $N^{th}$ time of link equalization needs to be performed, read initial fast equalization timeout duration of the primary chip and initial fast equalization timeout duration of the secondary chip.

The initial fast equalization timeout duration of the primary chip is less than or equal to the equalization timeout duration that is of the primary chip in the fourth phase of equalization and that exists when the $(N-a)^{th}$ time of link equalization is performed. The initial fast equalization timeout duration of the secondary chip is less than or equal to the equalization timeout duration that is of the secondary chip in the third phase of equalization and that exists when the $(N-a)^{th}$ time of link equalization is performed. Both the initial fast equalization timeout duration of the primary chip and the initial fast equalization timeout duration of the secondary chip are device advertise values.

In an embodiment, the initial fast equalization timeout duration of the primary chip may be a value obtained after initialization calibration is performed on the physical layer PHY of the primary chip and the register is initialized. Similarly, the initial fast equalization timeout duration of the secondary chip may be a value obtained after initialization calibration is performed on the physical layer PHY of the secondary chip and the register is initialized. The process of performing initialization calibration on the PHY may be completed in the powering-on calibration process, or may be completed after the link enters the linkup phase at a low rate (for example, 2.5 G) and before rate change is performed to reach a higher rate.

In an embodiment, the initial fast equalization timeout duration may be represented by at least 3 bits. For example, referring to FIG. 6, the initial fast equalization timeout duration is represented by 3 bits, and locations of the 3 bits are 8, 9, and 10. Further, for a correspondence between a value at the bit locations 8, 9, and 10 and the initial fast equalization timeout duration, refer to Table 1.

TABLE 1

| Bit locations | Value at bit locations | Initial fast equalization timeout duration |
| --- | --- | --- |
| 10:8 | 000 | 0 |
| | 001 | 8 ms/16 ms |
| | 010 | 24 ms/32 ms |
| | 100 | 50 ms/58 ms |
| | 100 | 100 ms/108 ms |
| | 101 | 200 ms/208 ms |

Figure 6:
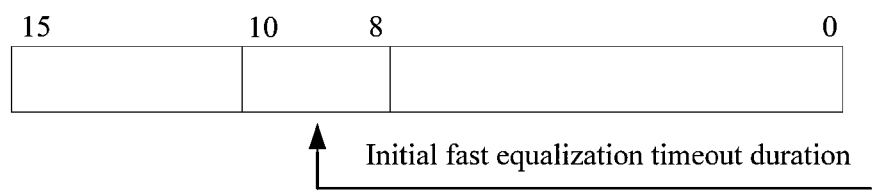
FIG. 6 shows another manner used for indicating fast equalization timeout duration.

When a register shown in FIG. 6 is the register of the primary chip, it may be learned from Table 1 that, 000 represents that the initial fast equalization timeout duration is 0, and a value other than 000 represents initial fast equalization timeout duration that is not 0. If the initial fast equalization timeout duration is 0, it indicates that the primary chip does not enable fast equalization. If the initial fast equalization timeout duration is not 0, it indicates that the primary chip enables fast equalization. For example, 001 represents that initial fast equalization timeout duration of the primary chip in the third phase and the fourth phase of equalization is 8 ms/16 ms. Similarly, when a register shown in FIG. 6 is the register of the secondary chip, it may be learned from Table 1 that, 000 represents that the initial fast equalization timeout duration is 0, and a value other than 000 represents initial fast equalization timeout duration that is not 0. If the initial fast equalization timeout duration is 0, it indicates that the secondary chip does not enable fast equalization. If the initial fast equalization timeout duration is not 0, it indicates that the secondary chip enables fast equalization. For example, 001 represents that initial fast equalization timeout duration of the secondary chip in the third phase and the fourth phase of equalization is 8 ms/16 ms.

S430. Configure first fast equalization timeout duration based on the initial fast equalization timeout duration of the primary chip and the initial fast equalization timeout duration of the secondary chip, and invoke the first equalization parameters, so that the primary chip and the secondary chip perform the $N^{th}$ time of link equalization based on the first equalization parameters and the first fast equalization timeout duration.

The first fast equalization timeout duration is a larger value in the initial fast equalization timeout duration of the primary chip and the initial fast equalization timeout duration of the secondary chip. The first fast equalization timeout duration is equalization timeout duration that is of the primary chip in the third phase of equalization and that exists when the $N^{th}$ time of link equalization is performed and equalization timeout duration that is of the primary chip in the fourth phase of equalization and that exists when the $N^{th}$ time of link equalization is performed, and is equalization timeout duration that is of the secondary chip in the third phase of equalization and that exists when the $N^{th}$ time of link equalization is performed and equalization timeout duration that is of the secondary chip in the fourth phase of equalization and that exists when the $N^{th}$ time of link equalization is performed.

In an embodiment, when the system software determines that the $N^{th}$ time of link equalization needs to be performed, for example, when the system software (or the system management chip) determines that the link needs to be repaired (for example, determines that hot reset or link retrain needs to be triggered), the system software may read the initial fast equalization timeout duration stored in the primary chip and read the initial fast equalization timeout duration stored in the secondary chip. Then, the system software compares the initial fast equalization timeout duration of the primary chip and the initial fast equalization timeout duration of the secondary chip, and writes the larger value in the initial fast equalization timeout duration of the primary chip and the initial fast equalization timeout duration of the secondary chip into the register of the primary chip and the register of the secondary chip. In addition, the system software stores the first equalization parameters into a register that is in the primary chip and that is adapted to store initial parameters. Subsequently, the system software (or the system management chip) may trigger the $N^{th}$ time of link equalization by sending first link repair indication information to the primary chip and the secondary chip, for example, trigger hot reset or link retrain. After the primary chip and the secondary chip enter a recovery phase based on the first link repair indication information, the primary chip and the secondary chip use the first fast equalization timeout duration, and invoke the first equalization parameters as the initial parameters, to perform the $N^{th}$ time of link equalization. According to different scenarios in which the $N^{th}$ time of link equalization is triggered, in the $N^{th}$ time of link equalization, equalization may be performed at each rate, or may be performed only at a rate.

An example in which equalization is performed at each rate is used. In phase 0, the primary chip sends, to the secondary chip, initial parameters (namely, the transmit parameter and the receive parameter of the secondary chip in the first equalization parameters) that need to be used by the secondary chip. When the primary chip and the secondary chip switch to a target rate in phase 1, the primary chip sends data to the secondary chip by using the transmit parameter of the primary chip in the first equalization parameters, and the secondary chip receives the data by using the receive parameter of the secondary chip in the first equalization parameters. Because the transmit parameter of the primary chip and the receive parameter of the secondary chip in the first equalization parameters are parameters that are selected in the $(N-a)^{th}$ time of equalization and that relatively match the link, bit/symbol locking can be quickly implemented, and a requirement that the bit error rate of data is less than 10E-4 is met. Then, the primary chip and the secondary chip may enter phase 2. In phase 2, the secondary chip adjusts the transmit parameter of the primary chip and the receive parameter of the secondary chip. Similarly, because the transmit parameter of the primary chip and the receive parameter of the secondary chip in the first equalization parameters relatively match the link, and an initial bit error rate of the link is relatively low, the secondary chip needs to slightly adjust (for example, one to two times) only the receive parameter of the secondary chip and the transmit parameter of the primary chip, to meet the link stability requirement (for example, the bit error rate is less than 10E-12). In this way, it can be ensured that the primary chip and the secondary chip complete equalization within the first fast equalization timeout duration, thereby reducing equalization timeout duration. Similarly, in phase 3, the secondary chip first sends data to the primary chip by using the transmit parameter of the secondary chip in the first equalization parameters, and the primary chip receives the data by using the receive parameter of the primary chip in the first equalization parameters. In this case, if the link stability requirement (for example, the bit error rate is less than 10E-12) is not met, the primary chip adjusts the receive parameter of the primary chip and the transmit parameter of the secondary chip. Because the receive parameter of the primary chip and the transmit parameter of the secondary chip in the first equalization parameters relatively match the link, and the initial bit error rate of the link is relatively low, the primary chip needs to slightly adjust (for example, one to two times) only the receive parameter of the primary chip and the transmit parameter of the secondary chip, to meet the link stability requirement (for example, the bit error rate is less than 10E-12). In this way, it can be ensured that the primary chip and the secondary chip complete equalization within the first fast equalization timeout duration, thereby reducing duration required in the equalization process. After rate change is completed and the link can run stably, the primary chip and the secondary chip perform rate change to reach a higher-level rate, repeatedly use the first fast equalization timeout duration, and invoke parameters that are in the first equalization parameters and that correspond to the rate as initial equalization parameters, to perform link equalization, until parameters that meet the link stability requirement at each rate are found again. It should be noted that the first equalization parameters include parameters corresponding to one or more rates, and the one or more rates include a rate that is to be reached after the primary chip and the secondary chip perform rate change to reach a higher-level rate. In this case, parameters that are in the first equalization parameters and that correspond to the to-be-reached rate are "the parameters that are in the first equalization parameters and that correspond to the rate". After link equalization at all rates supported by the chip is completed, before the $N^{th}$ time of link equalization is performed for the link, the link runs at a highest rate or service data is transmitted at a highest rate that can meet the link stability requirement.

It should be noted that in S410, if the first equalization parameters are stored into the external storage medium, before the system software triggers the $N^{th}$ time of link equalization, the system software may first read the first equalization parameters from the external storage medium, and then write the first equalization parameters into the register that is in the primary chip and that is adapted to store the initial parameters. Alternatively, the system software writes the transmit parameter and the receive parameter of the primary chip in the first equalization parameters into the register that is in the primary chip and that is adapted to store the initial parameters, and writes the transmit parameter and the receive parameter of the secondary chip in the first equalization parameters into a register that is in the secondary chip and that is adapted to store the initial parameters. However, in this case, before phase 0, the secondary chip needs to send the transmit parameter and the receive parameter of the secondary chip in the first equalization parameters to the primary chip, so that the primary chip sends the transmit parameter and the receive parameter of the secondary chip in the first equalization parameters to the secondary chip as the initial parameters of the secondary chip in phase 0.

In S410, if the first equalization parameters are stored into the primary chip, before phase 0, the primary chip (or the system software) first reads the first equalization parameters from a location at which the first equalization parameters are stored, and then writes the first equalization parameters into the register that is in the primary chip and that is adapted to store the initial parameters.

In S410, if the transmit parameter and the receive parameter of the primary chip in the first equalization parameters are stored into the primary chip, and the transmit parameter and the receive parameter of the secondary chip in the first equalization parameters are stored into the secondary chip, before the system software triggers the $N^{th}$ time of link equalization, the primary chip (or the system software) first reads the transmit parameter and the receive parameter of the primary chip in the first equalization parameters from a location at which the transmit parameter and the receive parameter of the primary chip in the first equalization parameters are stored, and then writes the read parameters into the register that is in the primary chip and that is adapted to store the initial parameters. In addition, the secondary chip needs to send the transmit parameter and the receive parameter of the secondary chip in the first equalization parameters to the primary chip, so that the primary chip sends the transmit parameter and the receive parameter of the secondary chip in the first equalization parameters to the secondary chip as the initial parameters of the secondary chip in phase 0.

It should be understood that in S430, the first equalization parameters overwrite initial parameters previously stored in a register adapted to store the initial parameters. It should be understood that the initial parameters previously stored in the register adapted to store the initial parameters are hardware initialize values (or device advertise values). When the $(N-a)^{th}$ time of link equalization is performed, used initial parameters are initial parameters that are stored in the register adapted to store the initial parameters and that exists before the $(N-a)^{th}$ time of link equalization is performed.

In an embodiment, fast equalization timeout duration (for example, the first fast equalization timeout duration) may be represented by at least 3 bits. For example, referring to FIG. 5, the fast equalization timeout duration is represented by 3 bits, and locations of the 3 bits are 26, 27, and 28. Further, for a correspondence between a value at the bit locations 26, 27, and 28 and the fast equalization timeout duration, refer to Table 2. It should be understood that a possible value of the initial fast equalization timeout duration shown in Table 1 is the same as a possible value of the fast equalization timeout duration shown in Table 2.

TABLE 2

| Bit locations | Value at bit locations | Fast equalization timeout duration |
|---|---|---|
| 28:26 | 000 | 0 |
| | 001 | 8 ms/16 ms |
| | 010 | 24 ms/32 ms |
| | 100 | 50 ms/58 ms |
| | 100 | 100 ms/108 ms |
| | 101 | 200 ms/208 ms |

Figure 5:
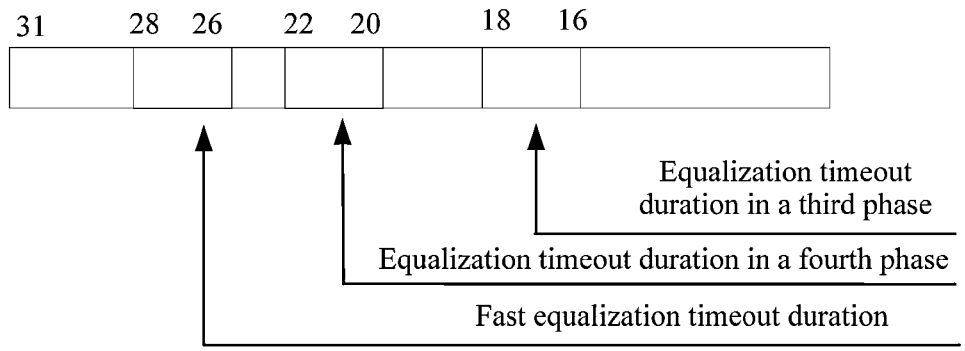
FIG. 5 shows a manner used for indicating fast equalization timeout duration according to this application.

When a register shown in FIG. 5 is the register of the primary chip, it may be learned from Table 2 that, 000 represents that the fast equalization timeout duration is 0, and a value other than 000 represents fast equalization timeout duration that is not 0. If the fast equalization timeout duration is 0, it indicates that the primary chip does not enable fast equalization. If the fast equalization timeout duration is not 0, it indicates that the primary chip enables fast equalization. For example, 001 represents that equalization timeout duration of the primary chip in the third phase and the fourth phase of equalization is 8 ms/16 ms. Similarly, when a register shown in FIG. 5 is the register of the secondary chip, it may be learned from Table 2 that, 000 represents that the fast equalization timeout duration is 0, and a value other than 000 represents fast equalization timeout duration that is not 0. If the fast equalization timeout duration is 0, it indicates that the secondary chip does not enable fast equalization. If the fast equalization timeout duration is not 0, it indicates that the secondary chip enables fast equalization. For example, 001 represents that equalization timeout duration of the secondary chip in the third phase and the fourth phase of equalization is 8 ms/16 ms. It should be noted that the fast equalization timeout duration of the primary chip is the same as the fast equalization timeout duration of the secondary chip.

For example, if a value at bit locations 8, 9, and 10 in the register of the primary chip shown in FIG. 5 is 001, and a value at bit locations 8, 9, and 10 in the register of the secondary chip shown in FIG. 5 is 011, a value at bit locations 26, 27, and 28 in the register shown in FIG. 6 is 011.

In an embodiment of this application, before S420, the method may further include: determining, by the system software, whether the primary chip supports fast equalization, and determining whether the secondary chip supports fast equalization. In addition, the system software performs S420 only when determining that both the primary chip and the secondary chip support fast equalization. On the contrary, the system software does not perform S420 when one of the primary chip and the secondary chip does not support fast equalization.

Further, when determining that the initial fast equalization timeout duration of the primary chip is not 0, the system software determines that the primary chip supports fast equalization. Similarly, when determining that the initial fast equalization timeout duration of the secondary chip is not 0, the system software determines that the secondary chip supports fast equalization. It may be understood that S420 is performed only when bit values indicating that the initial fast equalization timeout duration of the primary chip and the initial fast equalization timeout duration of the secondary chip are not 0.

In an embodiment, when the $N^{th}$ time of link equalization needs to be performed, the system software may first read the initial fast equalization timeout duration of the primary chip and the initial fast equalization timeout duration of the secondary chip. If the initial fast equalization timeout duration of the primary chip is not 0 and the initial fast equalization timeout duration of the secondary chip is not 0, the system software compares the two pieces of initial fast equalization timeout duration, and configures the first fast equalization timeout duration based on a comparison result.

It should be understood that whether the primary chip supports fast equalization means whether the first fast equalization timeout duration is allowed to be configured for the primary chip, or whether the primary chip can perform link equalization by using the first fast equalization timeout duration and the first equalization parameters. Similarly, whether the secondary chip supports fast equalization means whether the first fast equalization timeout duration is allowed to be configured for the secondary chip, or whether the secondary chip can perform link equalization by using the first fast equalization timeout duration and the first equalization parameters. Only when the first fast equalization timeout duration is allowed to be configured for both the primary chip and the secondary chip, or only when both the primary chip and the secondary chip can perform link equalization by using the first fast equalization timeout duration and the first equalization parameters, the first fast equalization timeout duration can be configured.

It should be further understood that in this application, configuring the first fast equalization timeout duration is equivalent to enabling fast equalization. When fast equalization is enabled, in the link equalization process, the hardware initialized equalization timeout duration in the third phase and the hardware initialized equalization timeout duration in the fourth phase are ignored. In an embodiment, the hardware initialized equalization timeout duration in the third phase and the hardware initialized equalization timeout duration in the fourth phase are not used. Instead, the first fast equalization timeout duration is used as the equalization timeout duration of the primary chip in the third phase of equalization, the equalization timeout duration of the secondary chip in the fourth phase of equalization, and the equalization timeout duration of the secondary chip in the third phase of equalization.

It should be noted that in an embodiment of this application, both the primary chip and the secondary chip may alternatively support fast equalization by default. To be specific, before S420, whether the primary chip supports fast equalization and whether the secondary chip supports fast equalization do not need to be determined. Instead, the first fast equalization timeout duration is directly configured.

Therefore, in the fast equalization method in an embodiment of this application, when a current time of link equalization is performed, previously stored equalization parameters that meet the link stability requirement and equalization timeout duration shorter than that in the prior art are used, so that duration of an equalization phase can be shortened. Because the equalization timeout duration is relatively short, in the fast equalization method in this embodiment of this application, a probability that an entire link repair (for example, hot reset or link retrain) process is completed within is can be improved while it is ensured that a high-speed high-loss link can run stably, to avoid the following problem as much as possible: Waiting times out in the link repair process initiated by the system software, and consequently the system software considers that the link is unavailable.

In addition, in the fast equalization method in an embodiment of this application, waiting duration (namely, Is) that is of the system software during link repair and that is specified in a current protocol does not need to be changed. Therefore, compatibility of a PCIe/CCIX protocol can be well implemented, and a modification operation on various versions of the system software due to a compatibility problem can also be avoided.

Further, after the link is stabilized at a highest rate, the system software (or the system management chip) may clear the first fast equalization timeout duration, for example, clear the value at the bit locations 26, 27, and 28 of the register shown in FIG. 6, that is, set the value at the bit locations 26, 27, and 28 of the register shown in FIG. 6 to 000.

In an embodiment, after the $N^{th}$ time of link equalization is performed, the system software (or the system management chip) may clear the first fast equalization timeout duration.

In an embodiment, second equalization parameters that meet the link equalization requirement and that are obtained when the $N^{th}$ time of link equalization is performed may be stored for subsequent link equalization. The second equalization parameters include a receive parameter and a transmit parameter of the primary chip and a receive parameter and a transmit parameter of the secondary chip.

It should be understood that the storage operation herein may be performed by the system software (or the system management chip), or may be performed by the primary chip and/or the secondary chip. For details, refer to the foregoing descriptions of S410. Details are not described herein again. It should be further understood that the second equalization parameters may overwrite the previously stored first equalization parameters.

Further, the method may further include: when determining that an $(N+b)^{th}$ time of link equalization needs to be performed, configuring, by the system software, second fast equalization timeout duration, and invoking the second equalization parameters, so that the primary chip and the secondary chip perform the $(N+b)^{th}$ time of link equalization based on the second equalization parameters and the second fast equalization timeout duration. The second fast equalization timeout duration is equalization timeout duration that is of the primary chip in the third phase of equalization and that exists when the $(N+b)^{th}$ time of link equalization is performed and equalization timeout duration that is of the primary chip in the fourth phase of equalization and that exists when the $(N+b)^{th}$ time of link equalization is performed, and is equalization timeout duration that is of the secondary chip in the third phase of equalization and that exists when the $(N+b)^{th}$ time of link equalization is performed and equalization timeout duration that is of the secondary chip in the fourth phase of equalization and that exists when the $(N+b)^{th}$ time of link equalization is performed, the second fast equalization timeout duration is the same as the first fast equalization timeout duration, $b \geq 1$, and b is an integer.

For example, after a time period following performing of the $N^{th}$ time of link equalization, if the system software (or the system management chip) determines that link repair needs to be performed again (for example, determines that heat reset or link retrain needs to be triggered), the system software may configure the second fast equalization timeout duration, and invoke the second equalization parameters. Then, the system software may send second link repair indication information to the primary chip and the secondary chip to trigger the $(N+b)^{th}$ time of link equalization, for example, hot reset or link retrain. After entering the recovery phase based on the second link repair indication information, the primary chip and the secondary chip use the second fast equalization timeout duration, and invoke the second equalization parameters as initial equalization parameters, to perform the $(N+b)^{th}$ time of link equalization. For details of a process of performing the $(N+b)^{th}$ time of link equalization, refer to the foregoing descriptions of the process of performing the $N^{th}$ time of link equalization. Details are not described herein again.

In the fast equalization method in this embodiment of this application, when a current time of fast equalization is performed, equalization parameters that are obtained when fast equalization is previously performed and that enables the link to run stably are used, so that the link can quickly reach a stable state, thereby reducing duration required in a link equalization process.

This application further provides a fast equalization apparatus. The apparatus may be adapted to perform the foregoing fast equalization method. Therefore, for the apparatus in this embodiment, refer to the related limitations and descriptions in the foregoing method embodiment. For brevity, a same or similar part is not described again in this embodiment. It should be noted that the apparatus in this embodiment may be a system management chip.

Figure 7:
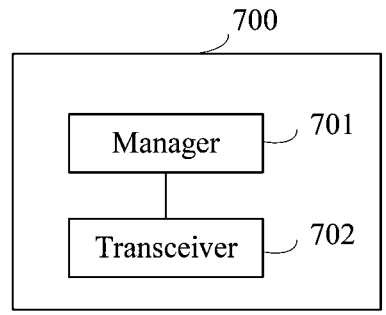
FIG. 7 is a schematic diagram of a fast equalization apparatus according to this application.

FIG. 7 shows a fast equalization apparatus 700 according to an embodiment. The apparatus 700 includes a manager 701 and a transceiver 702.

The manager 701 is adapted to store first equalization parameters that meet a link stability requirement and that are obtained when an $(N-a)^{th}$ time of link equalization is performed, where the first equalization parameters include a receive parameter and a transmit parameter of a primary chip and a receive parameter and a transmit parameter of a secondary chip, $N \geq 2$, $1 \leq a \leq N$, and both a and N are integers.

In an embodiment, the manager 701 may store the first equalization parameters into the primary chip or an external storage medium. The manager 701 may alternatively store related parameters of the primary chip in the first equalization parameters into the primary chip, and store related parameters of the secondary chip in the first equalization parameters into the secondary chip.

The transceiver 702 is adapted to: when the manager 701 determines that an $N^{th}$ time of link equalization needs to be performed, read initial fast equalization timeout duration of the primary chip and initial fast equalization timeout duration of the secondary chip, where the initial fast equalization timeout duration of the primary chip is less than or equal to equalization timeout duration that is of the primary chip in a fourth phase of equalization and that exists when the $(N-a)^{th}$ time of link equalization is performed, the initial fast equalization timeout duration of the secondary chip is less than or equal to equalization timeout duration that is of the secondary chip in a third phase of equalization and that exists when the $(N-a)^{th}$ time of link equalization is performed, both the initial fast equalization timeout duration of the primary chip and the initial fast equalization timeout duration of the secondary chip are device advertise values, and both the equalization timeout duration that is of the primary chip in the fourth phase of equalization and that exists when the $(N-a)^{th}$ time of link equalization is performed and the equalization timeout duration that is of the secondary chip in the third phase of equalization and that exists when the $(N-a)^{th}$ time of link equalization is performed are hardware initialize values.

The manager 701 is further adapted to: configure first fast equalization timeout duration based on the initial fast equalization timeout duration of the primary chip and the initial fast equalization timeout duration of the secondary chip, and invoke the first equalization parameters, so that the primary chip and the secondary chip perform the $N^{th}$ time of link equalization based on the first fast equalization timeout duration and the first equalization parameters, where the first fast equalization timeout duration is a larger value in the initial fast equalization timeout duration of the primary chip and the initial fast equalization timeout duration of the secondary chip, and the first fast equalization timeout duration is equalization timeout duration that is of the primary chip in the third phase of equalization and that exists when the $N^{th}$ time of link equalization is performed and equalization timeout duration that is of the primary chip in the fourth phase of equalization and that exists when the $N^{th}$ time of link equalization is performed, and is equalization timeout duration that is of the secondary chip in the third phase of equalization and that exists when the $N^{th}$ time of link equalization is performed and equalization timeout duration that is of the secondary chip in the fourth phase of equalization and that exists when the $N^{th}$ time of link equalization is performed.

It should be noted that the first equalization parameters include parameters corresponding to one or more rates, and the one or more rates include a rate that is to be reached after the $N^{th}$ time of link equalization is performed. In this case, parameters that are in the first equalization parameters and that correspond to the to-be-reached rate are the first equalization parameters invoked by the manager 701 when the $N^{th}$ time of link equalization is performed. In an embodiment of this application, the manager 701 is further adapted to: determine whether the primary chip supports fast equalization, and determine whether the secondary chip supports the fast equalization.

Correspondingly, that the manager 701 is further adapted to configure first fast equalization timeout duration specifically includes: configuring the first fast equalization timeout duration when both the primary chip and the secondary chip support the fast equalization.

Further, that the manager 701 is further adapted to determine whether the primary chip supports fast equalization specifically includes: when the initial fast equalization timeout duration of the primary chip is not 0, determining that the primary chip supports the fast equalization.

Similarly, that the manager 701 is further adapted to determine whether the secondary chip supports the fast equalization specifically includes: when the initial fast equalization timeout duration of the secondary chip is not 0, determining that the secondary chip supports the fast equalization.

In an embodiment of this application, the manager 701 is further adapted to store second equalization parameters that meet the link stability requirement and that are obtained when the $N^{th}$ time of link equalization is performed, where the second equalization parameters include a receive parameter and a transmit parameter of the primary chip and a receive parameter and a transmit parameter of the secondary chip.

In an embodiment of this application, after the $N^{th}$ time of link equalization is performed, the manager 701 is further adapted to clear the first fast equalization timeout duration.

In an embodiment of this application, the manager 701 is further adapted to: when determining that an $(N+b)^{th}$ time of link equalization needs to be performed, configure second fast equalization timeout duration, and invoke the second equalization parameters, so that the primary chip and the secondary chip perform the $(N+b)^{th}$ time of link equalization based on the second fast equalization timeout duration and the second equalization parameters, where the second fast equalization timeout duration is equalization timeout duration that is of the primary chip in the third phase of equalization and that exists when the $(N+b)^{th}$ time of link equalization is performed and equalization timeout duration that is of the primary chip in the fourth phase of equalization and that exists when the $(N+b)^{th}$ time of link equalization is performed, and is equalization timeout duration that is of the secondary chip in the third phase of equalization and that exists when the $(N+b)^{th}$ time of link equalization is performed and equalization timeout duration that is of the secondary chip in the fourth phase of equalization and that exists when the $(N+b)^{th}$ time of link equalization is performed, the second fast equalization timeout duration is the same as the first fast equalization timeout duration, $b \geq 1$, and b is an integer.

This application further provides a second type of fast equalization apparatus. The apparatus may also be adapted to perform the foregoing fast equalization method. Therefore, for the apparatus in this embodiment, refer to the related limitations and descriptions in the foregoing method embodiment. It should be noted that the apparatus in this embodiment may be a BIOS.

Figure 8:
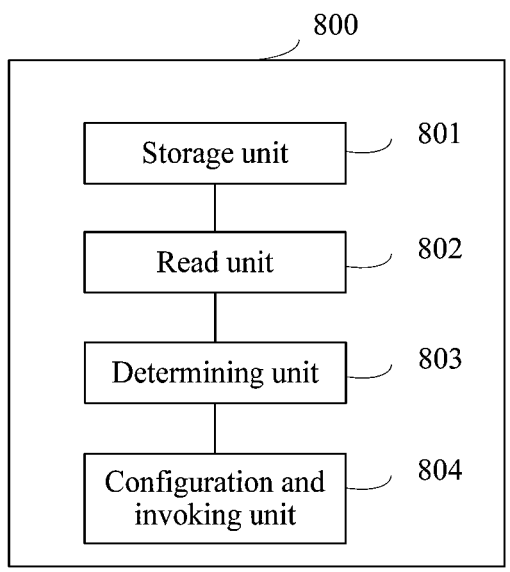
FIG. 8 is a schematic diagram of another fast equalization apparatus according to this application.

FIG. 8 shows a fast equalization apparatus 800 according to an embodiment. The apparatus includes a storage unit 801, a read unit 802, a determining unit 803, and a configuration and invoking unit 804.

The storage unit 801 is adapted to store first equalization parameters that meet a link stability requirement and that are obtained when an $(N-a)^{th}$ time of link equalization is performed, where the first equalization parameters include a receive parameter and a transmit parameter of a primary chip and a receive parameter and a transmit parameter of a secondary chip, $N \geq 2$, $1 \leq a \leq N$, and both a and N are integers.

In an embodiment, the storage unit 801 may store the first equalization parameters into the primary chip or an external storage medium. The storage unit 801 may alternatively store related parameters of the primary chip in the first equalization parameters into the primary chip, and store related parameters of the secondary chip in the first equalization parameters into the secondary chip.

The read unit 802 is adapted to: when the determining unit 803 determines that an $N^{th}$ time of link equalization needs to be performed, read initial fast equalization timeout duration of the primary chip and initial fast equalization timeout duration of the secondary chip, where the initial fast equalization timeout duration of the primary chip is less than or equal to equalization timeout duration that is of the primary chip in a fourth phase of equalization and that exists when the $(N-a)^{th}$ time of link equalization is performed, the initial fast equalization timeout duration of the secondary chip is less than or equal to equalization timeout duration that is of the secondary chip in a third phase of equalization and that exists when the $(N-a)^{th}$ time of link equalization is performed, both the initial fast equalization timeout duration of the primary chip and the initial fast equalization timeout duration of the secondary chip are device advertise values, and both the equalization timeout duration that is of the primary chip in the fourth phase of equalization and that exists when the $(N-a)^{th}$ time of link equalization is performed and the equalization timeout duration that is of the secondary chip in the third phase of equalization and that exists when the $(N-a)^{th}$ time of link equalization is performed are hardware initialize values.

The configuration and invoking unit 804 is adapted to: configure first fast equalization timeout duration based on the initial fast equalization timeout duration of the primary chip and the initial fast equalization timeout duration of the secondary chip, and invoke the first equalization parameters, so that the primary chip and the secondary chip perform the $N^{th}$ time of link equalization, where the first fast equalization timeout duration is a larger value in the initial fast equalization timeout duration of the primary chip and the initial fast equalization timeout duration of the secondary chip, and the first fast equalization timeout duration is equalization timeout duration that is of the primary chip in the third phase of equalization and that exists when the $N^{th}$ time of link equalization is performed and equalization timeout duration that is of the primary chip in the fourth phase of equalization and that exists when the $N^{th}$ time of link equalization is performed, and is equalization timeout duration that is of the secondary chip in the third phase of equalization and that exists when the $N^{th}$ time of link equalization is performed and equalization timeout duration that is of the secondary chip in the fourth phase of equalization and that exists when the $N^{th}$ time of link equalization is performed.

It should be noted that the first equalization parameters include parameters corresponding to one or more rates, and the one or more rates include a rate that is to be reached after the $N^{th}$ time of link equalization is performed. In this case, parameters that are in the first equalization parameters and that correspond to the to-be-reached rate are the first equalization parameters invoked by the configuration and invoking unit 804 when the $N^{th}$ time of link equalization is performed.

In an embodiment of this application, the determining unit 803 is further adapted to: determine whether the primary chip supports fast equalization, and determine whether the secondary chip supports the fast equalization. Correspondingly, that the configuration and invoking unit 804 is adapted to configure first fast equalization timeout duration based on the initial fast equalization timeout duration of the primary chip and the initial fast equalization timeout duration of the secondary chip specifically includes: configuring the first fast equalization timeout duration when both the primary chip and the secondary chip support the fast equalization.

In an embodiment of this application, that the determining unit 803 is further adapted to determine whether the primary chip supports fast equalization specifically includes: when the initial fast equalization timeout duration of the primary chip is not 0, determining that the primary chip supports the fast equalization.

Further, that the determining unit 803 is further adapted to determine whether the secondary chip supports the fast equalization specifically includes: when the initial fast equalization timeout duration of the secondary chip is not 0, determining that the secondary chip supports the fast equalization.

In an embodiment of this application, the storage unit 801 is further adapted to store second equalization parameters that meet the link stability requirement and that are obtained when the $N^{th}$ time of link equalization is performed, where the second equalization parameters include a receive parameter and a transmit parameter of the primary chip and a receive parameter and a transmit parameter of the secondary chip.

In an embodiment of this application, after the $N^{th}$ time of link equalization is performed, the configuration and invoking unit 804 is further adapted to clear the first fast equalization timeout duration.

In an embodiment of this application, the configuration and invoking unit 804 is further adapted to: when the determining unit 803 determines that an $(N+b)^{th}$ time of link equalization needs to be performed, configure second fast equalization timeout duration, and invoke the second equalization parameters, so that the primary chip and the secondary chip perform the $(N+b)^{th}$ time of link equalization based on the second fast equalization timeout duration and the second equalization parameters, where the second fast equalization timeout duration is equalization timeout duration that is of the primary chip in the third phase of equalization and that exists when the $(N+b)^{th}$ time of link equalization is performed and equalization timeout duration that is of the primary chip in the fourth phase of equalization and that exists when the $(N+b)^{th}$ time of link equalization is performed, and is equalization timeout duration that is of the secondary chip in the third phase of equalization and that exists when the $(N+b)^{th}$ time of link equalization is performed and equalization timeout duration that is of the secondary chip in the fourth phase of equalization and that exists when the $(N+b)^{th}$ time of link equalization is performed, the second fast equalization timeout duration is the same as the first fast equalization timeout duration, b≥1, and b is an integer.

This application further provides a third type of fast equalization apparatus. The apparatus may also be adapted to perform the foregoing fast equalization method. Correspondingly, for the apparatus, refer to the related limitations in the foregoing method embodiment. A same or similar part is not described again in this embodiment.

Figure 9:
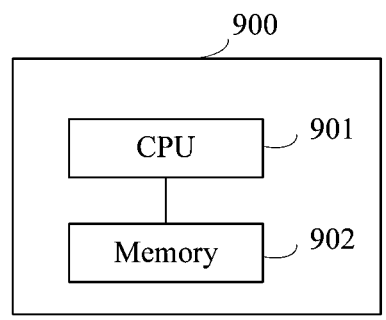
FIG. 9 is a schematic diagram of still another fast equalization apparatus according to this application.

FIG. 9 shows a fast equalization apparatus 900 according to an embodiment. The apparatus 900 includes a central processing unit (CPU) 901 and a memory 902. The memory 902 is adapted to store code. The CPU 901 is adapted to execute the code stored in the memory 902, to implement a function of the apparatus 900 in this embodiment. It should be learned that the CPU 901 is a CPU in a processor system to which a PCIe bus applied.

The memory 902 is adapted to store first equalization parameters that meet a link stability requirement and that are obtained when an $(N-a)^{th}$ time of link equalization is performed, where the first equalization parameters include a receive parameter and a transmit parameter of a primary chip and a receive parameter and a transmit parameter of a secondary chip, N≥2, 1≤a≤N, and both a and N are integers.

It should be understood that the foregoing storage operation may be performed by the CPU 901.

In an embodiment, the memory 902 or the CPU 901 may store the first equalization parameters into the primary chip or an external storage medium. The memory 902 or the CPU 901 may alternatively store related parameters of the primary chip in the first equalization parameters into the primary chip, and store related parameters of the secondary chip in the first equalization parameters into the secondary chip.

The CPU 901 is adapted to: when determining that an $N^{th}$ time of link equalization needs to be performed, read initial fast equalization timeout duration of the primary chip and initial fast equalization timeout duration of the secondary chip, where the initial fast equalization timeout duration of the primary chip is less than or equal to equalization timeout duration that is of the primary chip in a fourth phase of equalization and that exists when the $(N-a)^{th}$ time of link equalization is performed, the initial fast equalization timeout duration of the secondary chip is less than or equal to equalization timeout duration that is of the secondary chip in a third phase of equalization and that exists when the $(N-a)^{th}$ time of link equalization is performed, both the initial fast equalization timeout duration of the primary chip and the initial fast equalization timeout duration of the secondary chip are device advertise values, and both the equalization timeout duration that is of the primary chip in the fourth phase of equalization and that exists when the $(N-a)^{th}$ time of link equalization is performed and the equalization timeout duration that is of the secondary chip in the third phase of equalization and that exists when the $(N-a)^{th}$ time of link equalization is performed are hardware initialize values.

The CPU 901 is further adapted to: configure first fast equalization timeout duration based on the initial fast equalization timeout duration of the primary chip and the initial fast equalization timeout duration of the secondary chip, and invoke the first equalization parameters, so that the primary chip and the secondary chip perform the $N^{th}$ time of link equalization, where the first fast equalization timeout duration is a larger value in the initial fast equalization timeout duration of the primary chip and the initial fast equalization timeout duration of the secondary chip, and the first fast equalization timeout duration is equalization timeout duration that is of the primary chip in the third phase of equalization and that exists when the $N^{th}$ time of link equalization is performed and equalization timeout duration that is of the primary chip in the fourth phase of equalization and that exists when the $N^{th}$ time of link equalization is performed, and is equalization timeout duration that is of the secondary chip in the third phase of equalization and that exists when the $N^{th}$ time of link equalization is performed and equalization timeout duration that is of the secondary chip in the fourth phase of equalization and that exists when the $N^{th}$ time of link equalization is performed.

It should be noted that the first equalization parameters include parameters corresponding to one or more rates, and the one or more rates include a rate that is to be reached after the $N^{th}$ time of link equalization is performed. In this case, parameters that are in the first equalization parameters and that correspond to the to-be-reached rate are the first equalization parameters invoked by the CPU 901 when the $N^{th}$ time of link equalization is performed.

In an embodiment of this application, the CPU 901 is further adapted to: determine whether the primary chip supports fast equalization, and determine whether the secondary chip supports the fast equalization. Correspondingly, that the CPU 901 is adapted to configure first fast equalization timeout duration based on the initial fast equalization timeout duration of the primary chip and the initial fast equalization timeout duration of the secondary chip specifically includes: configuring the first fast equalization timeout duration when both the primary chip and the secondary chip support the fast equalization.

In an embodiment of this application, that the CPU 901 is further adapted to determine whether the primary chip supports fast equalization specifically includes: when the initial fast equalization timeout duration of the primary chip is not 0, determining that the primary chip supports the fast equalization.

Further, that the CPU 901 is further adapted to determine whether the secondary chip supports the fast equalization specifically includes: when the initial fast equalization timeout duration of the secondary chip is not 0, determining that the secondary chip supports the fast equalization.

In an embodiment of this application, the memory 902 is further adapted to store second equalization parameters that meet the link stability requirement and that are obtained when the $N^{th}$ time of link equalization is performed, where the second equalization parameters include a receive parameter and a transmit parameter of the primary chip and a receive parameter and a transmit parameter of the secondary chip.

It should be understood that the storage operation herein may be performed by the CPU 901.

In an embodiment of this application, after the $N^{th}$ time of link equalization is performed, the CPU 901 is further adapted to clear the first fast equalization timeout duration.

In an embodiment of this application, the CPU 901 is further adapted to: when determining that an $(N+b)^{th}$ time of link equalization needs to be performed, configure second fast equalization timeout duration, and invoke the second equalization parameters, so that the primary chip and the secondary chip perform the $(N+b)^{th}$ time of link equalization based on the second fast equalization timeout duration and the second equalization parameters, where the second fast equalization timeout duration is equalization timeout duration that is of the primary chip in the third phase of equalization and that exists when the $(N+b)^{th}$ time of link equalization is performed and equalization timeout duration that is of the primary chip in the fourth phase of equalization and that exists when the $(N+b)^{th}$ time of link equalization is performed, and is equalization timeout duration that is of the secondary chip in the third phase of equalization and that exists when the $(N+b)^{th}$ time of link equalization is performed and equalization timeout duration that is of the secondary chip in the fourth phase of equalization and that exists when the $(N+b)^{th}$ time of link equalization is performed, the second fast equalization timeout duration is the same as the first fast equalization timeout duration, $b \geq 1$, and b is an integer.

Figure 10:
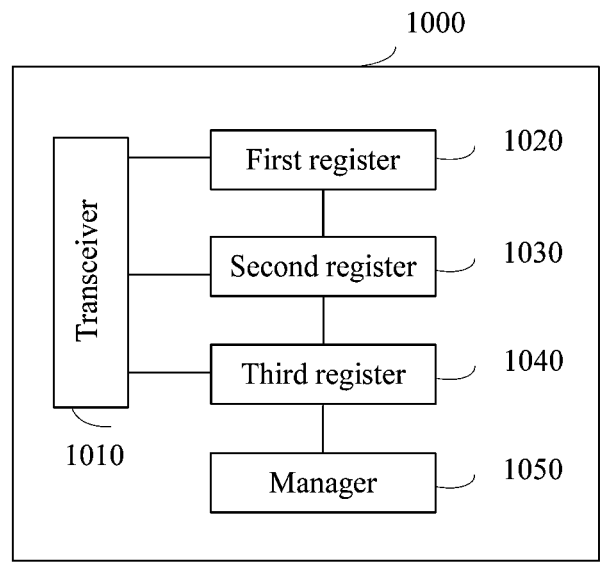
FIG. 10 is a schematic structural diagram of a chip according to this application.

This application further provides a chip 1000, and the chip is the primary chip in the foregoing embodiment. As shown in FIG. 10, the chip 1000 includes a transceiver 1010, a first register 1020, a second register 1030, a third register 1040, and a manager 1050.

The transceiver 1010 is adapted to send first equalization parameters or a receive parameter and a transmit parameter of the chip in the first equalization parameters, where the first equalization parameters are parameters that meet a link stability requirement and that are obtained when an $(N-a)^{th}$ time of link equalization is performed, the first equalization parameters include the receive parameter and the transmit parameter of the chip and a receive parameter and a transmit parameter of a peer chip, $N \geq 2$, $1 \leq a \leq N$, and both a and N are integers.

The first register 1020 is adapted to store initial fast equalization timeout duration of the chip, where the initial fast equalization timeout duration of the chip is less than or equal to equalization timeout duration that is of the chip in a fourth phase of equalization and that exists when the $(N-a)^{th}$ time of link equalization is performed, the initial fast equalization timeout duration of the chip is a device advertise value, and the equalization timeout duration that is of the chip in the fourth phase of equalization and that exists when the $(N-a)^{th}$ time of link equalization is performed is a hardware initialize value.

The transceiver 1010 is further adapted to: send the initial fast equalization timeout duration of the chip, and receive first fast equalization timeout duration and the first equalization parameters, where the first fast equalization timeout duration is a larger value in the initial fast equalization timeout duration of the chip and initial fast equalization timeout duration of the peer chip, the initial fast equalization timeout duration of the peer chip is less than or equal to equalization timeout duration that is of the peer chip in a third phase of equalization and that exists when the $(N-a)^{th}$ time of link equalization is performed, the equalization timeout duration that is of the peer chip in the third phase of equalization and that exists when the $(N-a)^{th}$ time of link equalization is performed is a hardware initialize value, and the initial fast equalization timeout duration of the peer chip is a device advertise value.

The manager 1050 is adapted to: set the first equalization parameters in the second register 1030, and set the first fast equalization timeout duration in the third register 1040. Alternatively, the second register 1030 is adapted to set the first equalization parameters, and the third register 1040 is adapted to set the first fast equalization timeout duration.

The manager 1050 is further adapted to: when the transceiver 1010 receives first link repair indication information, perform an $N^{th}$ time of link equalization based on the first fast equalization timeout duration and the first equalization parameters, where the first link repair indication information is used to trigger the $N^{th}$ time of link equalization, and the first fast equalization timeout duration is equalization timeout duration that is of the chip in the third phase of equalization and that exists when the $N^{th}$ time of link equalization is performed and equalization timeout duration that is of the chip in the fourth phase of equalization and that exists when the $N^{th}$ time of link equalization is performed, and is equalization timeout duration that is of the peer chip in the third phase of equalization and that exists when the $N^{th}$ time of link equalization is performed and equalization timeout duration that is of the peer chip in the fourth phase of equalization and that exists when the $N^{th}$ time of link equalization is performed.

It should be noted that the first equalization parameters include parameters corresponding to one or more rates, and the one or more rates include a rate that is to be reached after the $N^{th}$ time of link equalization is performed. In this case, parameters that are in the first equalization parameters and that correspond to the to-be-reached rate are the first equalization parameters used by the manager 1050 when performing the $N^{th}$ time of link equalization.

Specifically, in this embodiment, when the $(N-a)^{th}$ time of link equalization is performed, after a link runs stably, the chip sends, to system software (or a system management chip), parameters of the chip (or parameters of the chip and parameters of the peer chip) that meet the link stability requirement. The system software may store the received parameters into the chip or an external storage medium, or the system software stores the received parameters of the chip into the chip. When determining that the $N^{th}$ time of link equalization needs to be performed, the system software reads the initial fast equalization timeout duration of the chip from the first register of the chip, determines the larger value in the initial fast equalization timeout duration of the chip and the initial fast equalization timeout duration of the peer chip, and writes the larger value (namely, the first fast equalization timeout duration) into the third register of the chip. In addition, the system software reads the foregoing stored parameters from the external storage medium or the chip, and then writes the parameters into the second register. Then, the chip may perform the $N^{th}$ time of link equalization based on the foregoing parameters stored in the second register and the first fast equalization timeout duration stored in the third register.

It should be understood that the external storage medium is a storage medium at a location other than the chip, the peer chip, and the system software.

It should be understood that the second register is a register that stores initial parameters used for link equalization. Before the second register stores the first equalization parameters or the transmit parameter and the receive parameter of the chip in the first equalization parameters, the second register stores a hardware initialize value.

In addition, it should be noted that the transceiver may not send the first equalization parameters or the receive parameter and the transmit parameter of the chip in the first equalization parameters. In this case, the chip may store the first equalization parameters or the receive parameter and the transmit parameter of the chip in the first equalization parameters into a register or firmware of the chip. Further, if the chip has a CPU or a component or unit with a function that can be implemented by a CPU, the transceiver may not receive the first equalization parameters or the receive parameter and the transmit parameter of the chip in the first equalization parameters, but first reads the foregoing parameters stored in the register or the firmware of the chip, and then writes the foregoing parameters into a location that is in the second register and that is used to store the initial parameters.

In an embodiment of this application, the transceiver 1010 is further adapted to send second equalization parameters that meet the link stability requirement and that are obtained when the $N^{th}$ time of link equalization is performed, or a receive parameter and a transmit parameter of the chip in the second equalization parameters, where the second equalization parameters include the receive parameter and the transmit parameter of the chip and a receive parameter and a transmit parameter of the peer chip.

It should be noted that the transceiver may not send the second equalization parameters or the receive parameter and the transmit parameter of the chip in the second equalization parameters. In this case, the chip may store the second equalization parameters or the receive parameter and the transmit parameter of the chip in the second equalization parameters into the register or the firmware of the chip.

In an embodiment of this application, the transceiver 1010 is further adapted to receive clearing indication information, where the clearing indication information is used to clear the first fast equalization timeout duration. After performing the $N^{th}$ time of link equalization, the manager 1050 is further adapted to clear the first fast equalization timeout duration based on the clearing indication information.

In an embodiment of this application, the transceiver 1010 is further adapted to receive second fast equalization timeout duration and the second equalization parameters, where the second fast equalization timeout duration is the same as the first fast equalization timeout duration. The second register 1030 is further adapted to store the second equalization parameters.

The manager 1050 is further adapted to: set the second equalization parameters in the second register 1030, and set the second fast equalization timeout duration in the third register 1040. Alternatively, the second register 1030 is further adapted to set the second equalization parameters, and the third register 1040 is further adapted to set the second fast equalization timeout duration.

The manager 1050 is further adapted to: when the transceiver 1010 receives second link repair indication information, perform an $(N+b)^{th}$ time of link equalization based on the second fast equalization timeout duration and the second equalization parameters, where the second link repair indication information is used to trigger the $(N+b)^{th}$ time of link equalization, the second fast equalization timeout duration is equalization timeout duration that is of the chip in the third phase of equalization and that exists when the $(N+b)^{th}$ time of link equalization is performed and equalization timeout duration that is of the chip in the fourth phase of equalization and that exists when the $(N+b)^{th}$ time of link equalization is performed, and is equalization timeout duration that is of the peer chip in the third phase of equalization and that exists when the $(N+b)^{th}$ time of link equalization is performed and equalization timeout duration that is of the peer chip in the fourth phase of equalization and that exists when the $(N+b)^{th}$ time of link equalization is performed, b≥1, and b is an integer.

It should be understood that, in the third register, a location that is used to store the second fast equalization timeout duration is the same as a location that is used to store the first fast equalization timeout duration. In the second register, a location that is used to store the first equalization parameters (or the receive parameter and the transmit parameter of the chip in the first equalization parameters) may be the same as or different from a location that is used to store the second equalization parameters (or the receive parameter and the transmit parameter of the chip in the second equalization parameters). When the two locations are different, either the first equalization parameters or the second equalization parameters may be used as the initial parameters.

Figure 11:
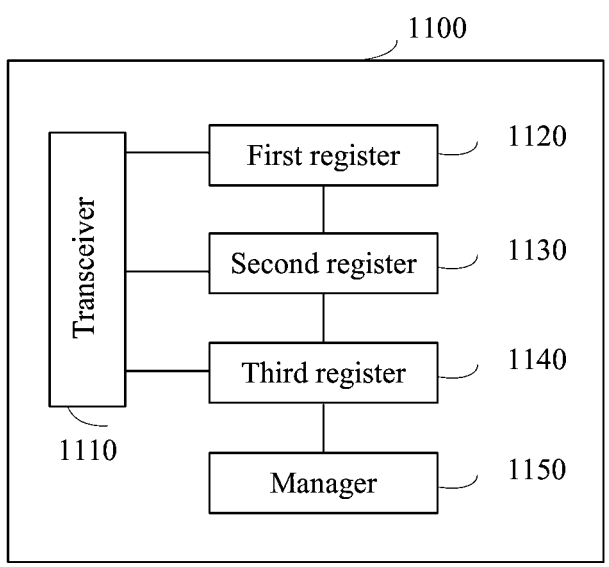
FIG. 11 is a schematic structural diagram of another chip according to this application.

This application further provides a chip 1100, and the chip 1100 is the secondary chip in the foregoing embodiment. As shown in FIG. 11, the chip 1100 includes a transceiver 1110, a first register 1120, a second register 1130, a third register 1140, and a manager 1150.

The transceiver 1110 is adapted to send first equalization parameters or a receive parameter and a transmit parameter of the chip in the first equalization parameters, where the first equalization parameters are parameters that meet a link stability requirement and that are obtained when an $(N-a)^{th}$ time of link equalization is performed, the first equalization parameters include the receive parameter and the transmit parameter of the chip and a receive parameter and a transmit parameter of a peer chip, $N \geq 2$, $1 \leq a \leq N$, and both a and N are integers.

The first register 1120 is adapted to store initial fast equalization timeout duration of the chip, where the initial fast equalization timeout duration of the chip is less than or equal to equalization timeout duration that is of the chip in a third phase of equalization and that exists when the $(N-a)^{th}$ time of link equalization is performed, the initial fast equalization timeout duration of the chip is a device advertise value, and the equalization timeout duration that is of the chip in the third phase of equalization and that exists when the $(N-a)^{th}$ time of link equalization is performed is a hardware initialize value.

The transceiver 1110 is further adapted to: send the initial fast equalization timeout duration of the chip, and receive first fast equalization timeout duration and the receive parameter and the transmit parameter of the chip in the first equalization parameters, where the first fast equalization timeout duration is a larger value in the initial fast equalization timeout duration of the chip and initial fast equalization timeout duration of the peer chip, the initial fast equalization timeout duration of the peer chip is less than or equal to equalization timeout duration that is of the peer chip in a fourth phase of equalization and that exists when the $(N-a)^{th}$ time of link equalization is performed, the equalization timeout duration that is of the peer chip in the fourth phase of equalization and that exists when the $(N-a)^{th}$ time of link equalization is performed is a hardware initialize value, and the initial fast equalization timeout duration of the peer chip is a device advertise value.

The manager 1150 is adapted to: set the receive parameter and the transmit parameter of the chip in the first equalization parameters in the second register 1130, and set the first fast equalization timeout duration in the third register 1140. Alternatively, the second register 1130 is adapted to set the receive parameter and the transmit parameter of the chip in the first equalization parameters, and the third register 1140 is adapted to set the first fast equalization timeout duration.

The manager 1150 is further adapted to: when the transceiver 1110 receives first link repair indication information, perform an $N^{th}$ time of link equalization based on the first fast equalization timeout duration and the receive parameter and the transmit parameter of the chip in the first equalization parameters, where the first link repair indication information is used to trigger the $N^{th}$ time of link equalization, and the first fast equalization timeout duration is equalization timeout duration that is of the chip in the third phase of equalization and that exists when the $N^{th}$ time of link equalization is performed and equalization timeout duration that is of the chip in the fourth phase of equalization and that exists when the $N^{th}$ time of link equalization is performed, and is equalization timeout duration that is of the peer chip in the third phase of equalization and that exists when the $N^{th}$ time of link equalization is performed and equalization timeout duration that is of the peer chip in the fourth phase of equalization and that exists when the $N^{th}$ time of link equalization is performed.

It should be noted that the first equalization parameters include parameters corresponding to one or more rates, and the one or more rates include a rate that is to be reached after the $N^{th}$ time of link equalization is performed. In this case, parameters that are in the first equalization parameters and that correspond to the to-be-reached rate are the receive parameter and the transmit parameter that are of the chip in the first equalization parameters and that are used by the manager 1150 when performing the $N^{th}$ time of link equalization.

In an embodiment, when the $(N-a)^{th}$ time of link equalization is performed, after a link runs stably, the chip sends, to system software (or a system management chip), parameters of the chip (or parameters of the chip and parameters of the peer chip) that meet the link stability requirement. The system software may store the received parameters into the chip, an external storage medium, or the peer chip, or the system software stores the received parameters of the chip into the chip. When determining that the $N^{th}$ time of link equalization needs to be performed, the system software reads the initial fast equalization timeout duration of the chip from the first register of the chip, determines the larger value in the initial fast equalization timeout duration of the chip and the initial fast equalization timeout duration of the peer chip, and stores the larger value (namely, the first fast equalization timeout duration) into the third register of the chip. In addition, the system software reads the foregoing stored parameters from the external storage medium, the chip, or the peer chip, and then writes the parameters into the second register. Then, the chip may perform the $N^{th}$ time of link equalization based on the foregoing parameters stored in the second register and the first fast equalization timeout duration stored in the third register.

It should be understood that the external storage medium is a storage medium at a location other than the chip, the peer chip, and the system software.

It should be understood that the second register is a register that stores initial parameters used for link equalization. Before the second register stores the first equalization parameters or the transmit parameter and the receive parameter of the chip in the first equalization parameters, the second register stores a hardware initialize value.

In addition, it should be noted that the transceiver may not send the first equalization parameters or the receive parameter and the transmit parameter of the chip in the first equalization parameters. In this case, the chip may store the first equalization parameters or the receive parameter and the transmit parameter of the chip in the first equalization parameters into a register or firmware of the chip. Further, if the chip has a CPU or a component or unit with a function that can be implemented by a CPU, the transceiver may not receive the first equalization parameters or the receive parameter and the transmit parameter of the chip in the first equalization parameters, but first reads the foregoing parameters stored in the register or the firmware of the chip, and then writes the foregoing parameters into a location that is in the second register and that is used to store the initial parameters.

In an embodiment of this application, the transceiver 1110 is further adapted to send second equalization parameters that meet the link stability requirement and that are obtained when the $N^{th}$ time of link equalization is performed, or a receive parameter and a transmit parameter of the chip in the second equalization parameters, where the second equalization parameters include the receive parameter and the transmit parameter of the chip and a receive parameter and a transmit parameter of the peer chip.

It should be noted that the transceiver 1110 may not send the second equalization parameters or the receive parameter and the transmit parameter of the chip in the second equalization parameters. In this case, the chip may store the second equalization parameters or the receive parameter and the transmit parameter of the chip in the second equalization parameters into the register or the firmware of the chip.

In an embodiment of this application, the transceiver 1110 is further adapted to receive clearing indication information, where the clearing indication information is used to clear the first fast equalization timeout duration. After performing the $N^{th}$ time of link equalization, the manager 1150 is further adapted to clear the first fast equalization timeout duration based on the clearing indication information.

In an embodiment of this application, the transceiver 1110 is further adapted to receive second fast equalization timeout duration and the receive parameter and the transmit parameter of the chip in the second equalization parameters, where the second fast equalization timeout duration is the same as the first fast equalization timeout duration.

The manager 1150 is further adapted to: set the receive parameter and the transmit parameter of the chip in the second equalization parameters in the second register, and set the second fast equalization timeout duration in the third register. Alternatively, the second register 1130 is further adapted to set the second equalization parameters, and the third register 1140 is further adapted to set the second fast equalization timeout duration.

The manager 1150 is further adapted to: when the transceiver 1110 receives second link repair indication information, perform an $(N+b)^{th}$ time of link equalization based on the second fast equalization timeout duration and the receive parameter and the transmit parameter of the chip in the second equalization parameters, where the second link repair indication information is used to trigger the $(N+b)^{th}$ time of link equalization, the second fast equalization timeout duration is equalization timeout duration that is of the chip in the third phase of equalization and that exists when the $(N+b)^{th}$ time of link equalization is performed and equalization timeout duration that is of the chip in the fourth phase of equalization and that exists when the $(N+b)^{th}$ time of link equalization is performed, and is equalization timeout duration that is of the peer chip in the third phase of equalization and that exists when the $(N+b)^{th}$ time of link equalization is performed and equalization timeout duration that is of the peer chip in the fourth phase of equalization and that exists when the $(N+b)^{th}$ time of link equalization is performed, $b \geq 1$, and b is an integer.

It should be understood that, in the third register, a location that is used to store the second fast equalization timeout duration is the same as a location that is used to store the first fast equalization timeout duration. In the second register, a location that is used to store the first equalization parameters (or the receive parameter and the transmit parameter of the chip in the first equalization parameters) may be the same as or different from a location that is used to store the second equalization parameters (or the receive parameter and the transmit parameter of the chip in the second equalization parameters). When the two locations are different, either the first equalization parameters or the second equalization parameters may be used as the initial parameters.

Figure 12:
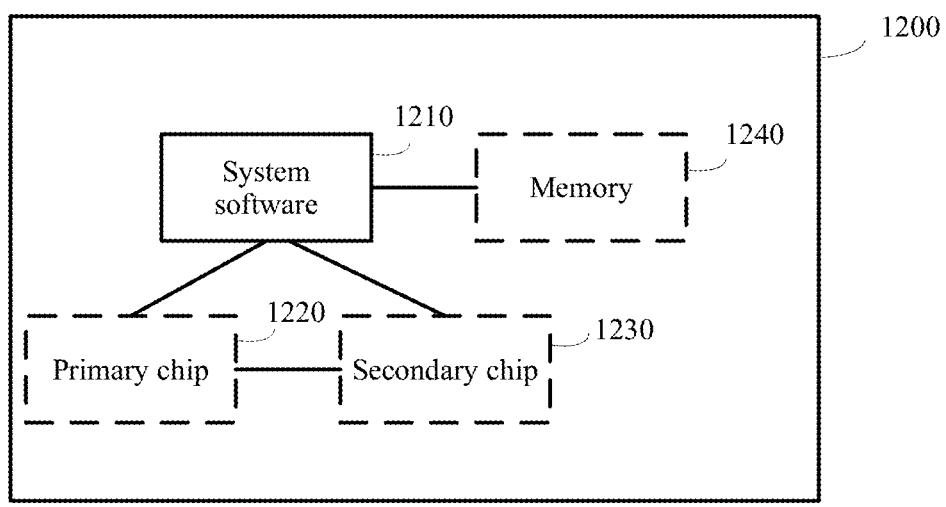
FIG. 12 is a schematic structural diagram of a communications system according to this application.

This application further provides a communications system 1200. As shown in FIG. 12, the communications system 1200 includes system software 1210, a primary chip 1220, and a secondary chip 1230. The primary chip 1220 and the secondary chip 1230 are connected to each other by using a PCIe/CCIX bus. It should be noted that the system software 1210 may be a BIOS.

The system software 1210 may be adapted to: store first equalization parameters that meet a link stability requirement and that are obtained when an $(N-a)^{th}$ time of link equalization is performed, where the first equalization parameters include a receive parameter and a transmit parameter of the primary chip 1220 and a receive parameter and a transmit parameter of the secondary chip 1230, $N \geq 2$, $1 \leq a \leq N$, and both a and N are integers;

when determining that an $N^{th}$ time of link equalization needs to be performed, read initial fast equalization timeout duration of the primary chip 1220 and initial fast equalization timeout duration of the secondary chip 1230, where the initial fast equalization timeout duration of the primary chip 1220 is less than or equal to equalization timeout duration that is of the primary chip 1220 in a fourth phase of equalization and that exists when the $(N-a)^{th}$ time of link equalization is performed, the initial fast equalization timeout duration of the secondary chip 1230 is less than or equal to equalization timeout duration that is of the secondary chip 1230 in a third phase of equalization and that exists when the $(N-a)^{th}$ time of link equalization is performed, both the initial fast equalization timeout duration of the primary chip 1220 and the initial fast equalization timeout duration of the secondary chip 1230 are device advertise values, and both the equalization timeout duration that is of the primary chip 1220 in the fourth phase of equalization and that exists when the $(N-a)^{th}$ time of link equalization is performed and the equalization timeout duration that is of the secondary chip 1230 in the third phase of equalization and that exists when the $(N-a)^{th}$ time of link equalization is performed are hardware initialize values; and configure first fast equalization timeout duration based on the initial fast equalization timeout duration of the primary chip 1220 and the initial fast equalization timeout duration of the secondary chip 1230, and invoke the first equalization parameters, so that the primary chip 1220 and the secondary chip 1230 perform the $N^{th}$ time of link equalization based on the first fast equalization timeout duration and the first equalization parameters, where the first fast equalization timeout duration is a larger value in the initial fast equalization timeout duration of the primary chip 1220 and the initial fast equalization timeout duration of the secondary chip 1230, and the first fast equalization timeout duration is equalization timeout duration that is of the primary chip 1220 in the third phase of equalization and that exists when the $N^{th}$ time of link equalization is performed and equalization timeout duration that is of the primary chip 1220 in the fourth phase of equalization and that exists when the $N^{th}$ time of link equalization is performed, and is equalization timeout duration that is of the secondary chip 1230 in the third phase of equalization and that exists when the $N^{th}$ time of link equalization is performed and equalization timeout duration that is of the secondary chip 1230 in the fourth phase of equalization and that exists when the $N^{th}$ time of link equalization is performed.

It should be noted that the first equalization parameters include parameters corresponding to one or more rates, and the one or more rates include a rate that is to be reached after the $N^{th}$ time of link equalization is performed. In this case, parameters that are in the first equalization parameters and that correspond to the to-be-reached rate are the first equalization parameters invoked by the system software 1210 when the $N^{th}$ time of link equalization is performed.

In an embodiment, the system software may further include a memory 1240, and the memory may be adapted to store the first equalization parameters.

In an embodiment of this application, the system software 1210 is further adapted to: determine whether the primary chip 1220 supports fast equalization, and determine whether the secondary chip 1230 supports the fast equalization. Correspondingly, that the system software 1210 configures first fast equalization timeout duration specifically includes: configuring the first fast equalization timeout duration when both the primary chip 1220 and the secondary chip 1230 support the fast equalization.

Further, that the system software 1210 determines whether the primary chip 1220 supports fast equalization specifically includes: when the initial fast equalization timeout duration of the primary chip 1220 is not 0, determining that the primary chip 1220 supports the fast equalization.

Similarly, that the system software 1210 determines whether the secondary chip 1230 supports the fast equalization specifically includes: when the initial fast equalization timeout duration of the secondary chip 1230 is not 0, determining that the secondary chip 1230 supports the fast equalization.

In an embodiment of this application, the system software 1210 is further adapted to store second equalization parameters that meet the link stability requirement and that are obtained when the $N^{th}$ time of link equalization is performed, where the second equalization parameters include a receive parameter and a transmit parameter of the primary chip 1220 and a receive parameter and a transmit parameter of the secondary chip 1230.

In an embodiment of this application, after the $N^{th}$ time of link equalization is performed, the system software 1210 is further adapted to clear the first fast equalization timeout duration.

In an embodiment of this application, the system software 1210 is further adapted to: when determining that an $(N+b)^{th}$ time of link equalization needs to be performed, configure second fast equalization timeout duration, and invoke the second equalization parameters, so that the primary chip 1220 and the secondary chip 1230 perform the $(N+b)^{th}$ time of link equalization based on the second fast equalization timeout duration and the second equalization parameters. The second fast equalization timeout duration is equalization timeout duration that is of the primary chip 1220 in the third phase of equalization and that exists when the $(N+b)^{th}$ time of link equalization is performed and equalization timeout duration that is of the primary chip 1220 in the fourth phase of equalization and that exists when the $(N+b)^{th}$ time of link equalization is performed, and is equalization timeout duration that is of the secondary chip 1230 in the third phase of equalization and that exists when the $(N+b)^{th}$ time of link equalization is performed and equalization timeout duration that is of the secondary chip 1230 in the fourth phase of equalization and that exists when the $(N+b)^{th}$ time of link equalization is performed, the second fast equalization timeout duration is the same as the first fast equalization timeout duration, $b \geq 1$, and b is an integer.

It should be noted that, for the foregoing apparatus, chip, and communications system, refer to the related descriptions in the method embodiment. Because unity exists between subjects protected by this application, there are many same or similar parts in descriptions of these subjects. For brevity, the method embodiment is comprehensively and fully described in this application document, and other embodiments are relatively simplified.

A person of ordinary skill in the art may be aware that, in combination with the examples described in the embodiments disclosed in this specification, units and algorithm steps may be implemented by using electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit.

When the functions are implemented in the form of a software function unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A fast equalization method, comprising:
storing first equalization parameters that satisfy a link stability requirement and are obtained when an $(N-a)^{th}$ time of link equalization is performed, wherein the first equalization parameters comprise a receive parameter and a transmit parameter of a primary chip and a receive parameter and a transmit parameter of a secondary chip, $N≥2$, $1≤a<N$, and both a and N are integers; and
in response to determining that an $N^{th}$ time of link equalization needs to be performed, reading a first initial fast equalization timeout duration of the primary chip and a second initial fast equalization timeout duration of the secondary chip, wherein the first initial fast equalization timeout duration is less than or equal to an equalization timeout duration that is of the primary chip in a fourth phase of equalization and that exists when the $(N-a)^{th}$ time of link equalization is performed, wherein the second initial fast equalization timeout duration is less than or equal to an equalization timeout duration that is of the secondary chip in a third phase of equalization and that exists when the $(N-a)^{th}$ time of link equalization is performed, wherein both the first and second initial fast equalization timeout durations are device advertised values and are hardware initialized values.

2. The method according to claim 1, wherein invoking the first equalization parameters comprises:
invoking parameters corresponding to a rate that needs to be reached after the $N^{th}$ time of link equalization is performed and that are in the first equalization parameters, so that the primary chip and the secondary chip perform the $N^{th}$ time of link equalization based on the first fast equalization timeout duration and the parameters corresponding to the rate.

3. The method according to claim 1, wherein before configuring the first fast equalization timeout duration based on the first and second initial fast equalization timeout durations, the method further comprises:
determining whether the primary chip supports fast equalization; and
determining whether the secondary chip supports the fast equalization; and
wherein configuring the first fast equalization timeout duration comprises:
configuring the first fast equalization timeout duration in response to determining that both the primary chip and the secondary chip support the fast equalization.

4. The method according to claim 3, wherein determining whether the primary chip supports fast equalization comprises:
when the first initial fast equalization timeout duration is not 0, determining that the primary chip supports the fast equalization.

5. The method according to claim 3, wherein determining whether the secondary chip supports the fast equalization comprises:
when the second initial fast equalization timeout duration is not 0, determining that the secondary chip supports the fast equalization.

6. The method according to claim 1, further comprising:
storing second equalization parameters that satisfy the link stability requirement and that are obtained when the Nth time of link equalization is performed, wherein the second equalization parameters comprise the receive parameter and the transmit parameter of the primary chip and the receive parameter and the transmit parameter of the secondary chip.

7. The method according to claim 6, further comprising:
in response to determining that an $(N+b)^{th}$ time of link equalization needs to be performed, configuring second fast equalization timeout duration; and
invoking the second equalization parameters, so that the primary chip and the secondary chip perform the $(N+b)^{th}$ time of link equalization based on the second fast equalization timeout duration and the second equalization parameters,
wherein the second fast equalization timeout duration represents an equalization timeout duration that is of the primary chip in the third phase of equalization and that exists when the $(N+b)^{th}$ time of link equalization is performed and an equalization timeout duration that is of the primary chip in the fourth phase of equalization and that exists when the $(N+b)^{th}$ time of link equalization is performed, and
wherein the second fast equalization timeout duration represents an equalization timeout duration that is of the secondary chip in the third phase of equalization and that exists when the $(N+b)^{th}$ time of link equalization is performed and an equalization timeout duration that is of the secondary chip in the fourth phase of equalization and that exists when the $(N+b)^{th}$ time of link equalization is performed, the second fast equalization timeout duration is the same as the first fast equalization timeout duration, $b≥1$, and b is an integer.

8. The method according to claim 1, wherein after the $N^{th}$ time of link equalization is performed, the method further comprises:
clearing the first fast equalization timeout duration.

9. The method according to claim 1, wherein the primary chip and the secondary chip are connected to each other via a peripheral component interconnect express (PCIe) bus or a cache coherent interconnect for accelerators (CCIX) bus.

10. The method according to claim 1, further comprising in response to determining that the $N^{th}$ time of link equalization needs to be performed, performing hot reset and link retrain that are triggered by an operating system.

11. The method according to claim 1, wherein the first initial fast equalization timeout duration is determined based on a physical layer (PHY) capability supported by the primary chip, or the second initial fast equalization timeout duration is determined based on a PHY capability supported by the secondary chip.

12. A fast equalization apparatus, comprising:
one or more processors;
a non-transitory storage medium coupled to the one or more processors and storing instructions for execution by the one or more processors, wherein the instructions, when executed by the one or more processors, configure the apparatus to:
store first equalization parameters that satisfy a link stability requirement and that are obtained when an $(N-a)^{th}$ time of link equalization is performed, wherein the first equalization parameters comprise a receive parameter and a transmit parameter of a primary chip and a receive parameter and a transmit parameter of a secondary chip, $N≥2$, $1≤a<N$, and both a and N are integers;
in response to determining that an $N^{th}$ time of link equalization needs to be performed, read a first initial fast equalization timeout duration of the primary chip and a second initial fast equalization timeout duration of the secondary chip, wherein the first initial fast equalization timeout duration is less than or equal to equalization timeout duration that is of the primary chip in a fourth phase of equalization and that exists when the $(N-a)^{th}$ time of link equalization is performed, wherein the second initial fast equalization timeout durations is less than or equal to equalization timeout duration that is of the secondary chip in a third phase of equalization and that exists when the (N−a)th time of link equalization is performed, and wherein both the first and second initial fast equalization timeout durations are device advertised values and are hardware initialized values.

13. The apparatus according to claim 12, wherein the instructions, when executed by the one or more processors, configure the apparatus to invoke parameters corresponding to a rate that needs to be reached after the $N^{th}$ time of link equalization is performed and that are in the first equalization parameters, so that the primary chip and the secondary chip perform the $N^{th}$ time of link equalization based on the first fast equalization timeout duration and the parameters corresponding to the rate.

14. The apparatus according to claim 12, wherein the instructions, when executed by the one or more processors, further configure the apparatus to:

determine whether the primary chip supports fast equalization;

determine whether the secondary chip supports the fast equalization; and configure the first fast equalization timeout duration when both the primary chip and the secondary chip support the fast equalization.

15. The apparatus according to claim 14, wherein the primary chip supports the fast equalization when the first initial fast equalization timeout duration is not 0.

16. The apparatus according to claim 14, wherein the secondary chip supports the fast equalization when the second initial fast equalization timeout duration of the secondary chip is not 0.

17. The apparatus according to claim 12, wherein the instructions, when executed by the one or more processors, further configure the apparatus to store second equalization parameters that satisfy the link stability requirement and that are obtained when the $N^{th}$ time of link equalization is performed, wherein the second equalization parameters comprise the receive parameter and the transmit parameter of the primary chip and the receive parameter and the transmit parameter of the secondary chip.

18. The apparatus according to claim 17, wherein the instructions, when executed by the one or more processors, further configure the apparatus to:

in response to determining that an $(N+b)^{th}$ time of link equalization needs to be performed, configure second fast equalization timeout duration; and invoke the second equalization parameters, so that the primary chip and the secondary chip perform the (N+b)$^{th}$ time of link equalization based on the second fast equalization timeout duration and the second equalization parameters, wherein the second fast equalization timeout duration represents an equalization timeout duration that is of the primary chip in the third phase of equalization and that exists when the $(N+b)^{th}$ time of link equalization is performed and an equalization timeout duration that is of the primary chip in the fourth phase of equalization and that exists when the $(N+b)^{th}$ time of link equalization is performed, and wherein the second fast equalization timeout duration represents an equalization timeout duration that is of the secondary chip in the third phase of equalization and that exists when the $(N+b)^{th}$ time of link equalization is performed and an equalization timeout duration that is of the secondary chip in the fourth phase of equalization and that exists when the $(N+b)^{th}$ time of link equalization is performed, the second fast equalization timeout duration is the same as the first fast equalization timeout duration, b≥1, and b is an integer.

19. The apparatus according to claim 12, wherein the instructions, when executed by the one or more processors, further configure the apparatus to:

after the Nth time of link equalization is performed, clear the first fast equalization timeout duration.

20. A communications system, comprising system software, a primary chip, and a secondary chip connected to each other via a peripheral component interconnect express (PCIe) bus or a cache coherent interconnect for accelerators (CCIX) bus; and wherein the system software, when executed, is adapted to perform a fast equalization method, the method comprising:

storing first equalization parameters that satisfy a link stability requirement and are obtained when an $(N-a)^{th}$ time of link equalization is performed, wherein the first equalization parameters comprise a receive parameter and a transmit parameter of a primary chip and a receive parameter and a transmit parameter of a secondary chip, N≥2, 1≤a<N, and both a and N are integers; and in response to determining that an $N^{th}$ time of link equalization needs to be performed, reading a first initial fast equalization timeout duration of the primary chip and a second initial fast equalization timeout duration of the secondary chip, wherein the first initial fast equalization timeout duration is less than or equal to an equalization timeout duration that is of the primary chip in a fourth phase of equalization and that exists when the $(N-a)^{th}$ time of link equalization is performed, wherein the second initial fast equalization timeout duration is less than or equal to an equalization timeout duration that is of the secondary chip in a third phase of equalization and that exists when the $(N-a)^{th}$ time of link equalization is performed, wherein both the first and second initial fast equalization timeout durations are device advertised values and are hardware initialized values.

* * * * *